(12) United States Patent
Tsao

(10) Patent No.: US 7,701,455 B2
(45) Date of Patent: Apr. 20, 2010

(54) DATA RENDERING METHOD FOR VOLUMETRIC 3D DISPLAYS

(76) Inventor: Che-Chih Tsao, 16 Walnut St., Suite 43, Arlington, MA (US) 02476

( * ) Notice: Subject to any disclaimer, the term of this patent is extended or adjusted under 35 U.S.C. 154(b) by 1210 days.

(21) Appl. No.: 11/185,405

(22) Filed: Jul. 20, 2005

(65) Prior Publication Data

US 2006/0017724 A1 Jan. 26, 2006

Related U.S. Application Data

(60) Provisional application No. 60/589,626, filed on Jul. 21, 2004.

(51) Int. Cl.
*G06T 15/00* (2006.01)
(52) U.S. Cl. .................. 345/419; 345/581; 345/582; 345/619
(58) Field of Classification Search ........... 345/619, 345/582, 589, 6; 348/51
See application file for complete search history.

(56) References Cited

U.S. PATENT DOCUMENTS

| | | | | |
|---|---|---|---|---|
| 5,583,972 | A * | 12/1996 | Miller ..................... | 345/419 |
| 6,183,088 | B1 * | 2/2001 | LoRe et al. ................. | 353/7 |
| 6,489,961 | B1 | 12/2002 | Baxter, III et al. ........ | 345/424 |
| 6,554,430 | B2 * | 4/2003 | Dorval et al. ................ | 353/7 |
| 2001/0045920 | A1 * | 11/2001 | Hall et al. ................... | 345/32 |
| 2002/0105518 | A1 | 8/2002 | Napoli | |
| 2002/0196253 | A1 | 12/2002 | Giovinco et al. | |
| 2004/0001111 | A1 * | 1/2004 | Fitzmaurice et al. ....... | 345/848 |
| 2004/0252892 | A1 * | 12/2004 | Yamauchi et al. .......... | 382/232 |
| 2005/0035979 | A1 * | 2/2005 | Mukoyama et al. ........ | 345/619 |
| 2005/0068328 | A1 * | 3/2005 | Hancock .................... | 345/582 |

OTHER PUBLICATIONS 100-million-voxel volumetric display, Gregg E. Favalora, Joshua Napoli, Deirdre M. Hall, Rick K. Dorval, Michael Giovinco, Michael J. Richmond, and Won S. Chun, Proc. SPIE 4712, 300 (2002), DOI:10.1117/12.480930.*

* cited by examiner

*Primary Examiner*—Xiao M Wu
*Assistant Examiner*—Phi Hoang

(57) ABSTRACT

The fundamental concept of expressing brightness level of a geometric primitive is to control the number of rendered display elements, representing desired brightness level, in the geometric primitive as a fraction of the maximum number of display elements, representing the maximum brightness level, that can be placed in it. There are two approaches to achieve this control: Point-based Rendering and Intersection-based Rendering. In Point-based Rendering, a geometric primitive is converted into a representation of sampling points and then the sampling points are rendered. In Intersection-based Rendering, the intersections of a geometric primitive with the frame slices are rendered. The basic procedure to render a texture-mapped surface is to divide the surface into a number of regions, each region having a different intensity range, and then render each region with a different density of display elements to represent different brightness level. The procedure of rendering a 3D volume with gray scale distribution is similar.

19 Claims, 11 Drawing Sheets

Fg. 12b

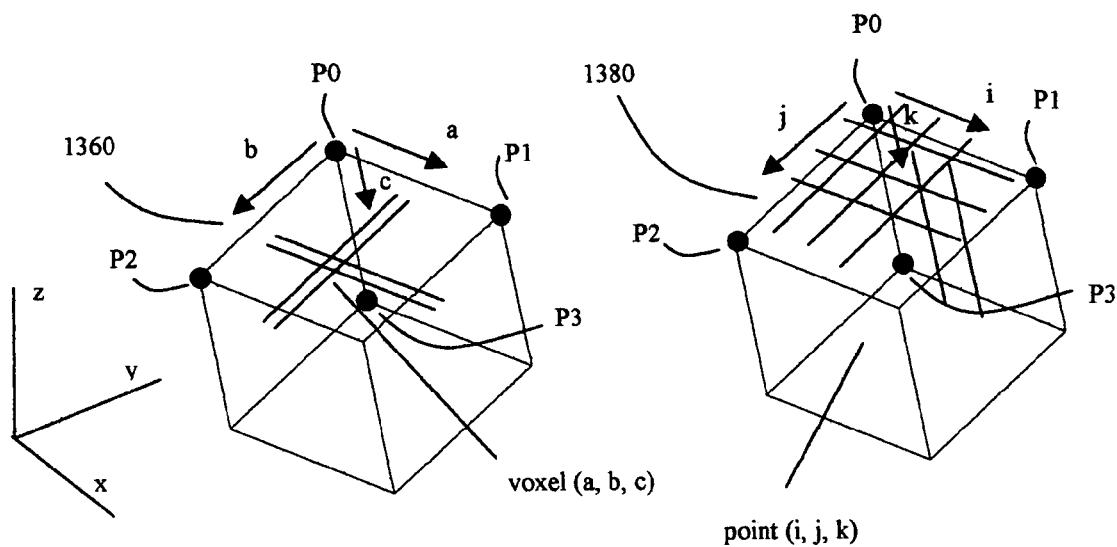
Fig. 13a
Fig. 13b
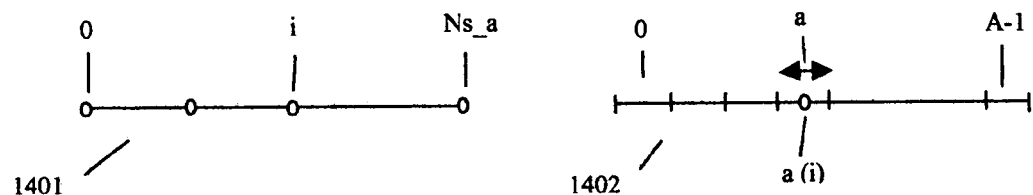
Fig. 14a
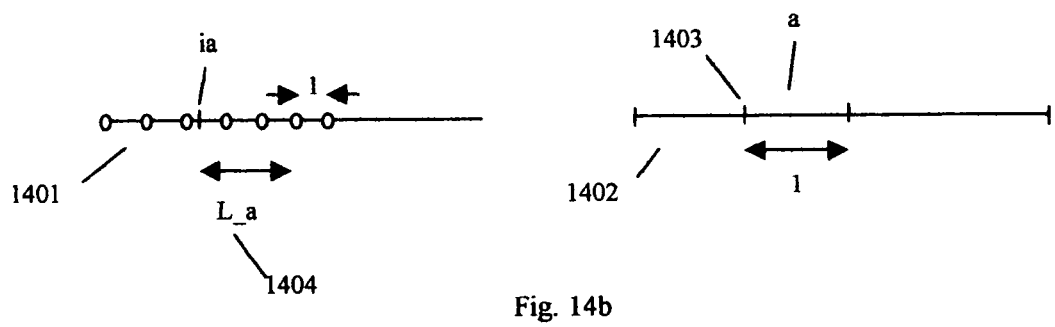
Fig. 14b

DATA RENDERING METHOD FOR VOLUMETRIC 3D DISPLAYS

CROSS-REFERENCE TO RELATED APPLICATIONS AND OTHER DOCUMENTS

This application claims the benefit of prior U.S. provisional application No. 60/589,626, filed Jul. 21, 2004, the contents of which are incorporated herein by reference.

This invention relates to Tsao U.S. patent application Ser. No. 09/882,826, filed Jun. 16, 2001, which is to be issued. This invention also relates to the following U.S. provisional application by Tsao: No. 60/581,422 filed Jun. 21, 2004, No. 60/589,108 filed Jul. 19, 2004, and No. 60/591,128 filed Jul. 26, 2004.

This invention also relates to the following US patents: Tsao et al., U.S. Pat. No. 5,754,147, 1998; Tsao, U.S. Pat. No. 5,954,414, 1999; Tsao, U.S. Pat. No. 6,302,542 B1, 2001; and Tsao, U.S. Pat. No. 6,765,566 B1, 2004.

This invention further relates to the following US Disclosure Documents:

1. Tsao, "Method and Apparatus for Color and Gray Volumetric 3D Display", U.S. Disclosure Documentation No. 467804 (2000);

2. Tsao, "Image Rendering Algorithms for Volumetric 3D Display", U.S. Disclosure Document No. 550743 (2004).

The patents, pending applications and disclosure documents mentioned above are therefore incorporated herein for this invention by reference.

STATEMENT REGARDING FEDERALLY SPONSORED R&D

Not Applicable

REFERENCE TO COMPACT DISK APPENDIX

Not Applicable

BACKGROUND OF THE INVENTION

This invention relates generally to data rendering methods to enhance the image quality for volumetric 3D displays, particularly for displaying color or gray scale images on volumetric 3D displays using image sources with binary pixels. A volumetric 3D display displays 3D images in a real 3D space. Each "voxel" in a volumetric image locates actually and physically at the spatial position where it is supposed to be, and light rays travel directly from that position toward omni-directions to form a real image in the eyes of viewers. As a result, a volumetric display possesses all major elements in both physiological and psychological depth cues and allows 360° walk-around viewing by multiple viewers without the need of special glasses.

One typical category of volumetric 3D (V3D) displays generates V3D images by moving a screen to sweep a volume and projecting 2D images on the screen. V3D images thus form in the swept volume by after-mage effect. The screen motion can in general be rotating or reciprocating. Tsao U.S. Pat. No. 6,765,566 B1 describes a system with a screen that reciprocates by a rotary motion. (See FIG. 20 of the referred patent) In principle, this is to revolve the screen about an axis and sweep a volume while keeping the screen surface always facing a fixed direction. For convenience, this is called "Rotary Reciprocating mechanism". In Tsao U.S. Pat. No. 6,302,542, a volumetric 3D display with a Rotary Reciprocating screen and a Rotary Reciprocating reflector serving as a linear interfacing unit is described. (See FIGS. 2a, 4b and 5b and the specification of the referred patent) The Rotary Reciprocating reflector reciprocates by a similar Rotary Reciprocating mechanism in synchronization with the screen but at a speed of ½ of the speed of the screen. FIG. 1 illustrates such a V3D display system, in side view. It has three major portions: a rotary reciprocating screen unit 1511 (comprising a screen 11 mounted on rotary arms 1522); a high frame rate image projection system 15; and an optical interfacing mechanism 13 (comprising a single reflector 1321 mounted on rotary arms 1322). A stationary reflector 1502 folds the projection path. The set of rotary arms 1322 and the set of rotary arm 1522 rotate synchronously. The figure shows the screen at the top position. When the screen rotates to the bottom position 11A, the interfacing reflector rotates to position 1321A The projection path is from the projector 15 to the interfacing reflector 1321, then to the folding reflector 1502 and then to the screen. This projection path length is kept constant as the screen and the interfacing reflector rotate. Projection path 402 strikes the interfacing reflector 1321 at an oblique angle, therefore the sides of the resulted display volume 12 are of the shape of parallelogram. The high-frame-rate projector projects a set of 2D image frames onto the moving screen. The moving screen moves and therefore distributes the 2D image frames to corresponding positions in the space swept by the screen. Together, the spatially distributed 2D images form a volumetric 3D image.

In the above example of volumetric 3D display, the preferred image source for the projector is DMD (Digital Micromirror Device) or FLCD (Ferroelectric Liquid Crystal Display). These are devices of black and white pixels. Using a single DMD or FLCD with a white or monochrome light results in a monochrome volumetric 3D display.

To create colors, one can use three DMDs or FLCDs, each illuminated by light of a different primary color. Alternatively, Tsao U.S. patent application Ser. No. 09/882,826 (2001) describes a method of using a single panel to generate colors. The single panel is divided into 3 sub-panels and each sub-panel is illuminated by light of a different primary color. The images of the 3 sub-panels are then recombined into one at projection. However, because each pixel has only two levels (black and white), the combination of three panels or sub-panels can only generate limited amount of colors.

Such limitation on gray scale and color exists on many other types of V3D displays, as long as they are based on binary image sources.

Presenting levels of gray scale (or intensity or brightness) is important in image display. The capability of presenting high gray scale is the fundamental for presenting high level of colors, because colors are formed by mixing of a limited number of primary colors and gray scale capability also determines the brightness level of each of the primary colors. Gray scale presentation is also one major issue in displaying biomedical data, as medical imaging instrument such as X-ray CT scanner creates images of scales of intensity.

Therefore, methods must be devised to break this hardware limitation.

Tsao U.S. Pat. No. 6,765,566 describes a data processing method for volumetric 3D display including a step of converting a set of raw 3D data into a Viewable Data, which comprises three basic geometric forms: scattered points, curves (including lines) and surfaces. Scattered points can be used to render a surface or the interior of a region. Curves can be used to represent, in addition to curves, surfaces. And surfaces can be used to represents, in addition to surfaces, volumes bounded by them. Viewable Data of the three basic forms is then processed into a set of Displayable Data using various color combination methods. The Displayable Data can then be used to generate the optical image patterns to be projected and recombined and displayed in the volumetric 3D display. Tsao also describes a method of rendering a surface with color or gray scale by stacking closely multiple layers of sub-surfaces, each of a different primary color but a similar shape, called "color sub-surfaces" method.

This invention is to further develop the method of using scattered points for rendering lines, surfaces and volumes, in order to display volumetric 3D images with high level of colors or gray scales in space.

This invention is to provide a detailed algorithm of using scattered points to render a solid triangular surface of gray scale by controlling the size and the density of the scattered points. (Called "Simple Rendering", see Sec. 4.1 in Detailed Description)

This invention is also to provide a detailed algorithm for rendering a solid triangular surface with color or gray scale based on the "color sub-surfaces" method. This algorithm combines three basic controls to create high level of colors/gray scales: point size control, point density control and multiple sub-surfaces. (Called "Multi-layer Rendering" in Sec. 4.2)

This invention is also to provide the principle and the algorithm for rendering a surface with a given bitmap texture. This texture-mapping algorithm also combines the use of the three basic controls. This allows a volumetric 3D display based on binary pixels to display texture mapped surfaces with reasonable presentation of color or gray scale distribution and without sacrificing resolution. (See Sec. 5 Texture Mapping)

This invention is also to provide the principle and the algorithm of using points to render a 3D volume with distributed gray scale (or a similar property), by controlling the size and the density distribution of the scattered points. (Called "Voxel Mapping" in chapter 6) This allows a volumetric 3D display based on binary pixels to display 3D volume data with reasonable presentation of color or gray scale distribution and without sacrificing resolution.

BRIEF SUMMARY OF THE INVENTION

This invention applies to volumetric 3D displays with spatially distributed display elements. The display elements can be pixels projected on a moving screen or on a stack of switchable screens. They can also be pixels on a moving display panel or on a stack of display panels. The display elements can be lighted up either by projection, or emission, or reflection.

The fundamental concept of expressing brightness level of a geometric primitive is to control the number of rendered (i.e. lighted up) display elements, representing desired brightness level, in the geometric primitive as a fraction of the maximum number of display elements, representing the maximum brightness level, that can be placed in it. There are two approaches to achieve this control: Point-based Rendering and Intersection-based Rendering.

In Point-based Rendering, a geometric primitive is converted into a representation of sampling points and then the sampling points are rendered. That is, rendering a geometric primitive, line or surface, is to render points that sample it. Therefore, there is no need to calculate the intersections of lines or triangles with the slicing frames. Each sampling point generally corresponds to one display element location. But the size of the image of a sampling point can be adjusted by dilating the point to adjacent display elements. That is, each sampling point maps to a number of display elements. In general, brightness level of a geometric primitive is proportional to the number of rendered display elements and to the brightness scale of the display element itself, if it has gray scale capacity. By controlling spatial distribution of sampling points and size of a sampling point, the total number of rendered display elements can be controlled to give desired visual intensities.

In Intersection-based Rendering, the intersections of a geometric primitive with the frame slices are rendered. In general, each intersection with a frame slice is a small bitmap comprising pixels of the frame. Stitching together all the small bitmaps of intersection forms a conceptual Composite Bitmap. The desired brightness level is then expressed by controlling the number of rendered pixels on the Composite Bitmap as a fraction of the maximum number of pixels allowed on the Composite Bitmap. The rendered Composite Bitmap is then mapped back to re-render the small bitmaps. The re-rendered small bitmaps then form the geometric primitive at the desired brightness level.

The basic procedure to render a monochromatic texture-mapped surface is as follows:

(1) Divide the full intensity scale of the texture map into a number of different intensity ranges. Each intensity range therefore corresponds to a different region on the texture map.

(2) Each region on the texture map maps to a corresponding region on the surface.

(3) Assign a brightness level to each corresponding region on the surface based on the intensity range that corresponds to that region.

(4) Render each corresponding region of the surface with a different density of display elements to represent different brightness level.

Point-based Rendering is the preferred method. Basically, each corresponding region of the surface is rendered under a mesh system that gives the desired brightness to the whole surface triangle, but sampling points are placed only in the corresponding region.

The basic procedure to render a 3D volume with distributed gray scale is similar to that of rendering a surface with a texture map, except that the mesh system and sampling are done in three dimensions.

BRIEF DESCRIPTION OF THE DRAWINGS

FIG. 12a-e illustrates method of texture mapping on a surface by this invention;

FIG. 13a-b and FIG. 14a-b illustrate method of Voxel Mapping for rendering a 3D volume by this invention;

DETAILED DESCRIPTION

1. Introduction

Figure 1:
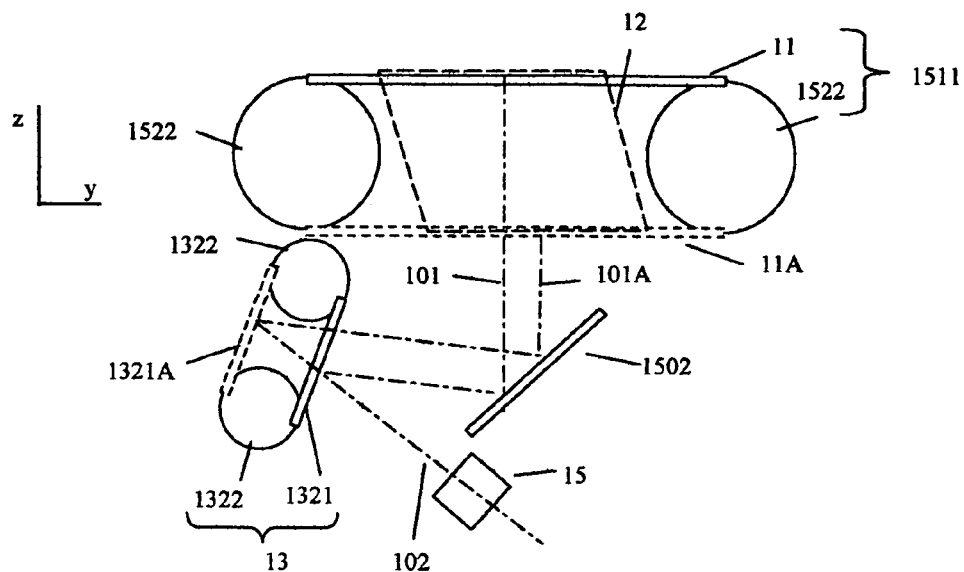
FIG. 1 illustrates a typical V3D display with a moving screen in the prior arts.

We'll use the V3D display described in FIG. 1 as an example to describe the principle and algorithms of this invention. Later, it will be shown how these principle and algorithms can also be applied to other types of volumetric 3D displays.

The volumetric 3D display space is therefore composed of a 3D array of light elements. These light elements are formed either by light projection onto a moving screen, or by sweeping a light emitting (or reflecting) display plane through space. In either case, these light elements are created from the "pixels" of the moving 2D display plane. These light elements are called "Grid Elements" (or more generally "display elements") here in order to distinguish them from the term "voxels". "Voxel" is a term most usually used in traditional computer graphics to describe a fundamental 3D graphic element that will be rendered into "3D graphics" (i.e. perspective 3D view on a 2D display). A voxel data in that sense is not usually equivalent to the meaning of a Grid Element, because of different resolution, gray (color) scale and transparency etc.

Figure 2:
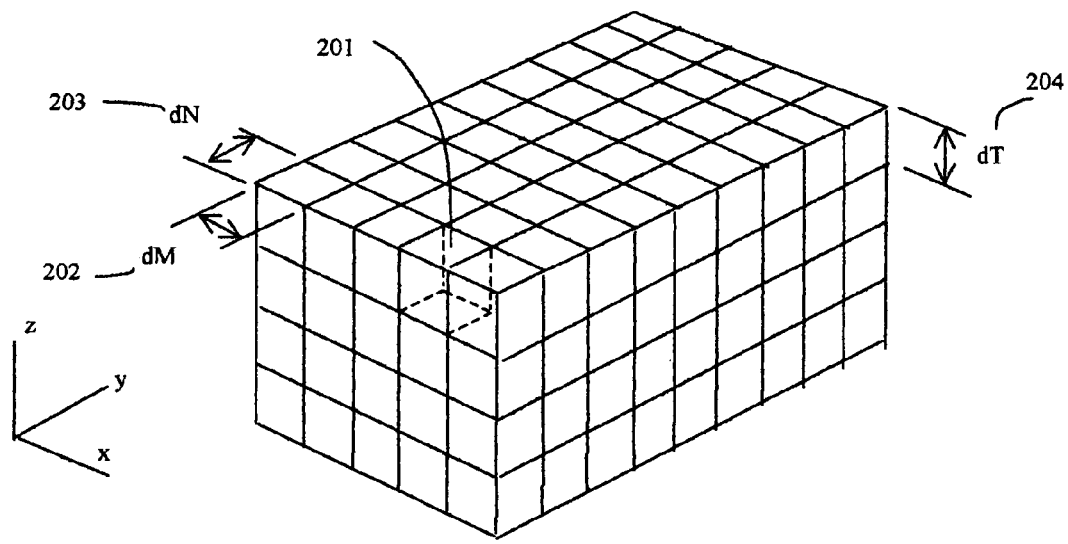
FIG. 2 illustrates a typical structure of display elements.

The collection of Grid Elements in 3D space is like a 3D grid system as shown in FIG. 2. A Grid Element is a 3D spot having length, width and height, as 201. The length 202 and width 203 corresponds to the size of a pixel of the projected image frame. The height 204 is measured in the direction of screen sweep and is the "thickness" of one "frame" or "slice" of the volumetric 3D image. The length, width and height of each Grid Element are d, dN and dT respectively. For ease of description and without loosing general validity, the illustration assumes the Grid Elements are aligned in orthogonal fashion. In practice, the display space shown in FIG. 1 has sides of parallelograms, which will introduce a shift correction of locations in the y-direction in order to obtain the orthogonal grid.

If the image projection system uses a single DMD or FLCD with a white light source, then each Grid Element is a binary (black or white) spot. Alternatively, Tsao U.S. patent application Ser. No. 09/882,826 describes a method of "Scaled Pattern Illumination", which illuminates each of a few adjacent pixels with a different intensity so that every group of a few adjacent pixels, each called a "composite pixel", can display a number of gray scales. In such cases, each composite pixel can be defined as one Grid Element. Therefore, each Grid Element will have some gray-scale capability.

For a color V3D display based on 3 display panels or 3 sub-panels, each Grid Element location has three superimposed Grid Elements, each of a different primary color. The collection of all Grid Elements of the same primary color is called a "field". The display space of the color volumetric 3D display therefore has 3 superimposed fields. Each field is just like a monochrome display except having a different primary color.

As described earlier, a volumetric 3D display displays three forms of "Viewable Data": points, curves (lines), surfaces (planes). Therefore, there are three basic geometric primitives:

Point, P (x y z, intensity/color)
Line, P0P1 (x0 y0 z0 x1 y1 z1 intensity/color)
Solid Triangle (triangular surface), P0P1P2 (x0 y0 z0 x1 y1 z1 x2 y2 z2 intensity/color) Any viewable data can be a combination of the three basic geometric primitives. For a monochrome image, each primitive carries an "intensity" data, which represents the brightness or gray scale of the primitive. For a color image, each primitive carries a "color" data, which, in general, contains three intensity values, each belongs to a different field of primary color.

2. Rendering a Point Primitive

A Point primitive: P (x y z, intensity/color)

Rendering a point is mapping the point coordinates (x, y, z) to one Grid Element location in the 3D grid of FIG. 2.

Figure 3A:
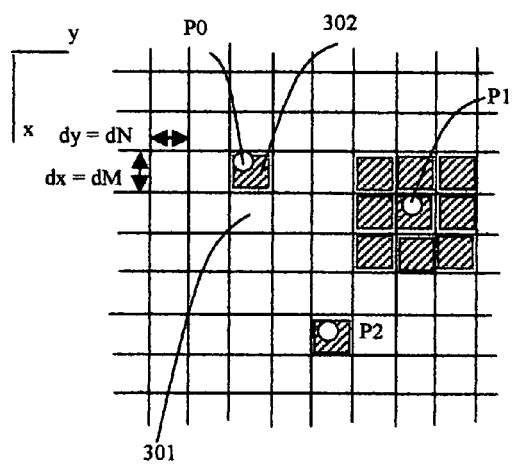
FIG. 3a-b illustrates methods of rendering a point.
Figure 3B:
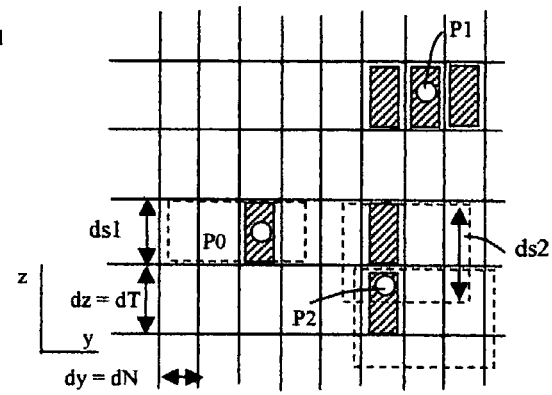

FIG. 3a shows the Grid Element structure as viewed facing x-y plane. Each square grid, such as 301, space represents a pixel on a frame. A point, such as P0, generally maps to one Grid Element location in the display space, represented by a hatched square, such as 302. A point can also be mapped to more than one Grid Elements when required by the intensity/color data. This is called Pixel Dilating that adjusts the size of a point to represent different brightness of a point, as P1 shown in FIG. 3a & 3b. FIG. 3b shows the Grid Element structure as viewed facing y-z plane. Pixel Dilating uses the adjacent pixels to show different point sizes. If taking 8 adjacent Grid Elements for dilating, then a point will use 3×3 Grid Elements and can have 10 size levels (from 0 to 9 Grid Elements, 0 representing black (or blank)). If taking 3 adjacent Grid Elements for dilating, then there are 2×2 Grid Elements with 5 size levels (from 0 to 4 Grid Elements) for one point.

A point generally maps to a Grid Element location on one "slice" (or "frame"). But it can also be mapped to more than one slices when desired. This can be done by enlarging the "slicing thickness", which determines the mapping of a point in the z-direction. As shown at 411 in FIG. 4b, a slicing thickness ds1=dT (the actual frame thickness) can result in Grid Elements of a line connecting only at corners 411. As a result, the line image could appear non-continuous. By using a larger slicing thickness, say ds2=1.5×dT, a point can map to two adjacent frames. An additional Grid Element 412 will be added to the line and make the line appear continuous. The same applies to the case of rendering surfaces the factor 1.5× is an "Over-sampling factor" (OSF).

3. Rendering a Line Primitive 3.1 Point-based Rendering

In general, a Point-based Rendering scheme is the preferred method to render lines and solid triangles. The Point-based scheme generally comprises the following two steps:

(1) Converting a geometric primitive into a set of sampling points representing the geometric primitive. Each sampling point is basically a Point primitive.

(2) Rendering each sampling point. That is, lines and solid triangles are all converted into points first and then points are rendered. Therefore, there is no need to calculate the intersections of lines or triangles to the slicing frames.

In general, brightness level of a geometric primitive is proportional to the number of rendered (i.e. lighted up) Grid Elements and to the brightness scale of the Grid Element itself, if it has gray scale capacity. By controlling spatial distribution of sampling points and size of a sampling point, the total number of lighted up Grid Elements can be controlled to give desired visual intensities when the points are displayed in a volumetric 3D display.

A Line primitive: L: (x0 y0 z0 x1 y1 z1 intensity/color)

Figure 4A:
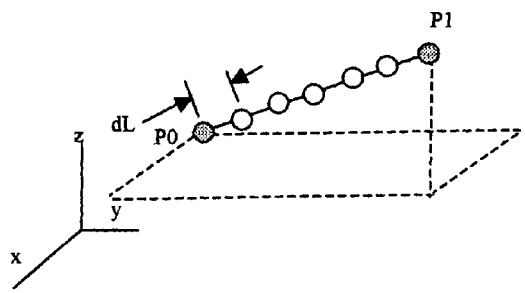
FIG. 4a-b illustrates method of Point-based Rendering of lines by this invention.

The line is sampled by equally spaced points, as illustrated in FIG. 4a. Assuming the line is divided into Ns segments, then the sampling points can be found as:

$$(x, y, z)_n = (x0 + n^*(x1 - x0)/Ns, \quad n = 0, 1, \ldots, Ns \quad (101)$$
$$y0 + n^*(y1 - y0)/Ns,$$
$$z0 + n^*(z1 - z0)/Ns)$$

with n=0 as point P0 (x0, y0, z0) and n=Ns as P1 (x1, y1, z1). There are totally Ns+1 points including the two end points.

By point-based rendering, the gray scale (or brightness or intensity) of the line (or of each field of the line) can be expressed by the density of point distribution along the line and by the size of each point. This is done in reference to an optimum number of sampling points (Ns_op+1). (Ns_op+1) is the required minimum number of sampling points to "fill" all Grid Elements along the line when displayed in the volumetric 3D display. This gives the full intensity (brightness) of the line image. Ns larger than Ns_op will not add more Grid Elements to the line, and hence will not increase the brightness further. Ns_op depends on the "scale" of a Gird Element as measured in terms of (x y z) coordinates used by the point data, that is, dM, dN and dT. Ns_op for a Line primitive is determined from the following formula:

$$Ns\_op = \qquad (102)$$

$int[\text{Max}[|x1 - x0|/dx\_op, |y1 - y0|/dy\_op, |z1 - z0|/dz\_op]]$ $int[\text{content}]$: operation of taking a minimum integer >= content Max: operation of taking the maximum number dx_op (minimum x spacing of sampling points) = $Fd * dM$ dy_op (minimum y spacing of sampling points) = $Fd * dN$ dz_op (minimum z spacing of sampling points) = $dT$ Fd(Pixel Dilating factor):

= 1 if no dilating

= 2 for 2×2 dilating (5 levels);

= 3 for 3×3 dilating (10 levels);

= 4 for 4×4 dilating (17 levels).

Basically, eqn. (102) looks at the minimum numbers of sampling points required in x, y and z directions respectively and selects the maximum number. The direction that gives the maximum sampling number is called the "dominant sampling axis" or "dominant sampling direction". The minimum spacing in each direction is directly related to the Grid Element scale. If Pixel Dilating is applied, then the minimum spacing in x and y directions is increased.

Figure 4B:
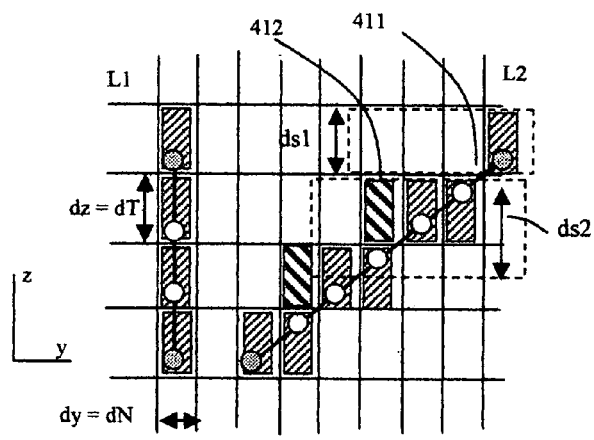

FIG. 4b illustrates two simplified examples, assuming no pixel dilating. For line L1 (a vertical line):

$Ns\_op=int[\text{Max}[|x1-x0|/dM, |y1-y0|/dN, |z1-z0|/dT]]=int[\text{Max}[0, 0, 3]]=3$, which makes the line image continuous in z direction The dominant sampling axis is z-axis. For line L2 (a line parallel to xz plane), $Ns\_op=int[\text{Max}[0, 6, 4]]=6$ which makes the line image continuous in both z and y directions. The dominant sampling axis is y-axis.

Ns smaller than Ns_op results in a smaller number of Grid Elements to be lighted up and hence less intensity (brightness). A Brightness Ratio for a Line primitive can be defined in reference to the full brightness of the line:

$$BR\_l(\text{Brightness Ratio for Line})=Br\_l/Br\_l\_op \qquad (103)$$

where Br_l=target brightness level of the line to be rendered

Br_l_op=brightness level of the line when fully-rendered (i.e. at optimum number of sampling points)

Brightness level of the line is proportional to the number of rendered (lighted up) Grid Elements and to the brightness scale of the Grid Element itself, if it has gray scale capacity. Therefore, $$BR\_l=Nge\_l*Bge/(Nge\_l\_op*Bge\_f) \qquad (104)$$

Nge_l=number of Grid Elements to be rendered in the line

Nge_l_op=number of Grid Elements in the line, if fully-rendered

Bge=brightness level of each rendered Grid Element, if it has brightness scale capacity Bge_f=full-brightness level of a Grid Element, if it has brightness scale capacity The number of Grid Elements in the line, if fully-rendered, can be related to the number of sampling points as follows, $$Nge\_l\_op=Ns\_op*Fd^2 \qquad (106)$$

Ns_op is calculated from eqn. (102)

Fd is the Pixel Dilating factor of eqn. (102).

Similarly, the desired number of Grid Elements is:

$$Nge\_l = Nsw * n\_pd \qquad (107)$$

n_pd = "dilating number"

= number of dilated pixels (including the original one) of a point

For example, if using 2×2 dilating (Fd=2), then 4 pixels will be lighted up if fully rendered. So, n_pd will take a value from 0 to 4, indicating different levels of dilating.

Therefore, eqn. (104) per (106) and (107) becomes:

$$BR\_l=(Ns/Ns\_op)*(n\_pd/Fd^2)*(Bge/Bge\_f) \qquad (108)$$

$$Ns*n\_pd*(Bge/Bge\_f)=Ns\_op*Fd^2*BR\_l \qquad (109)$$

Eqn. (109) summarizes how to render a line with a brightness ratio BR_l measured in reference to the fully-rendered line. The effect of number of sampling points, pixel dilating and Grid Element's gray-scale capacity are all included. A set of values (Ns, n_pd, (Bge/Bge_f)) satisfying eqn. (109) will, in general, render the line to the target brightness ratio BR_l.

If using binary pixels and no dilating, then n_pd=(Bge/Bge_f)=Fd=1. Eqn. (109) becomes $$Ns=Ns\_op*BR\_l \qquad (110)$$

Here, only point density controls the line brightness.

If Ns and (Bge/Bge_f) are fixed, then Pixel Dilating is the only control factor. For example, a 3×3 dilating gives 10 brightness level. A 4×4 dilating gives 17 levels.

3.2 Intersection-Based Rendering

Another approach of rendering lines and triangles can be called "Intersection-based Rendering". This scheme calculates the intersection of a frame slice with the line or triangle to be rendered. There can be various ways to define and to obtain the intersection. Giovinco et al. U.S. patent application Pub. No. 2002/0196253A1 describes algorithms of obtaining intersections of a line with a rotating screen, and Napoli U.S. patent application Pub. No. 2002/0105518A1 describes algorithms for a triangle with a rotating screen, both incorporated herein by reference.

Figure 5A:
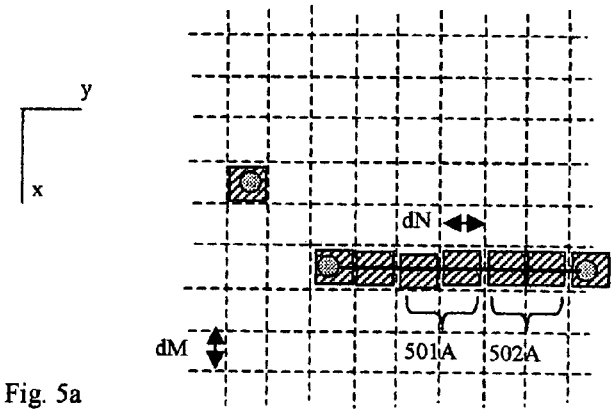
FIG. 5a-d and FIG. 6a-b illustrate method of Intersection-based Rendering of lines by this invention.

In general, the intersection is a small bitmap on the frame. FIGS. 5a and 5b illustrate two simplified examples using line L1 and line L2 again. For L2, a line segment 501 is mapped to a small bitmap 501A on a frame. Another line segment 502 is mapped to another small bitmap 502A on a different frame. Both bitmaps are fully rendered, i.e. at full brightness.

To display gray scale (or brightness or intensity) of the line, we still use the fully-filled line as a reference. The concept of Brightness Ratio and equations (103) and (104) still apply. The number of Grid Elements in the line, if fully-filled, Nge_l_op, can be related to the number of pixels in all the small intersection bitmaps of the line. For convenience, we can conceptually define a "Composite Bitmap at full brightness" by stitching all the small fully-filled bitmaps of intersections together. So, Nge_l_op=Np_CBM_f=total number of pixels on Composite Bitmap at full brightness In general, Nge_l=Np_CBM=number of rendered pixels on Composite Bitmap A smaller Np_CBM gives lower brightness. Controlling the spacing between adjacent rendered pixels controls Np_CBM.

Figure 5C:
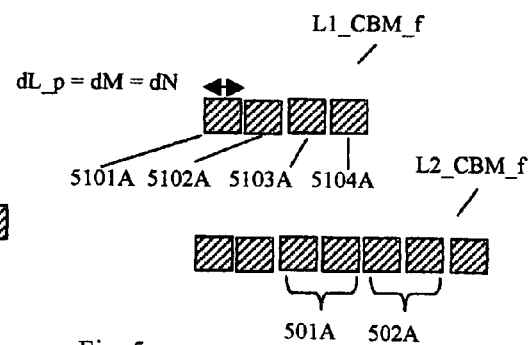
Figure 5B:
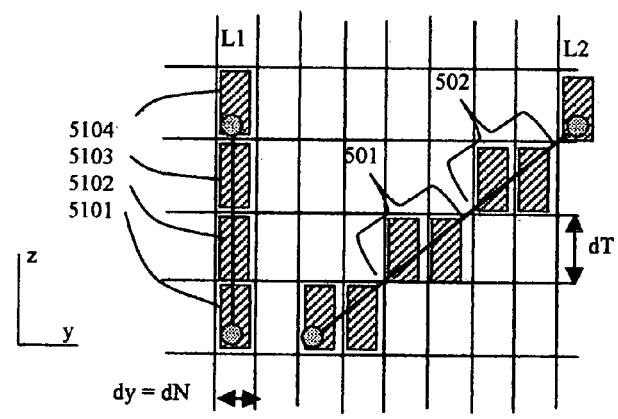

A Line primitive's Composite Bitmap is basically a line of pixels, as shown in FIG. 5c. Np_CBM is inversely proportional to the rendering spacing:

$Np\_CBM \propto 1/dL\_p$ dL_p=spacing between adjacent rendered pixels on the Composite Bitmap Therefore, $$Nge\_/Nge\_l\_op = Np\_CBM/Np\_CBM\_f = dL\_p\_op/dL\_p \qquad (120)$$

Per (120), eqn (104) becomes $$BR\_l = (dL\_p\_op/dL\_p)*(Bge/Bge\_f) \qquad (122)$$

Since dL_p_op=dM=dN, $$dL\_p(Bge/Bge\_f) = dM/BR\_l \qquad (124)$$

Eqn. (124) gives the desired spacing for rendered pixels to re-render a line's Composite Bitmap to give the targeted brightness ratio BR_l. If the pixel has no gray-scale capacity, i.e. Bge/Bge_f=1, then dL_p is simply inversely proportional to BR_l.

Once dLp is determined, the following two steps complete the rendering:

(1) Re-render the Composite Bitmap according to the new spacing dL_p. Remove pixels that do not match the new spacing.

(2) From the original, fully-filled small bitmaps of intersection, remove the pixels corresponding to those removed in step (1). These revised small bitmaps of intersection now has the target brightness ratio of BR_l.

Figure 5D:
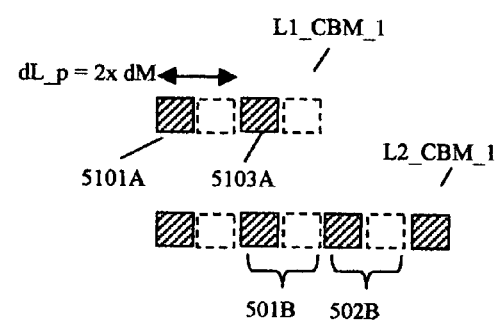
Figure 6A:
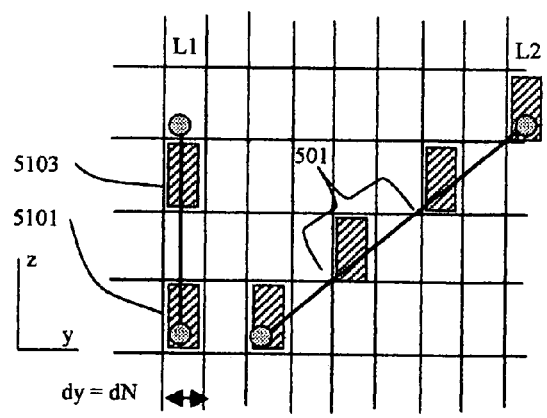
Figure 6B:
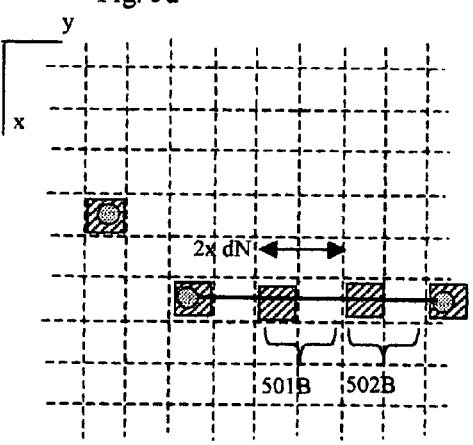

For example, in FIG. 5c, the fully-filled composite bitmap of L1 is L1_CBM_f, which stitches together the intersection bitmaps of L1 at slice locations 5101-5104 and therefore has four pixels 5101A-5104A, each corresponding to one intersection bitmap. It is similar to L2. By setting BR_l=½, the pixel spacing dL_p becomes 2× dM. FIG. 5d illustrates the re-rendered composite bitmaps under the new spacing, L1_CBM_1 and L2_CBM_. Their pixel density is ½× full intensity. FIG. 6a and 6b illustrates the rendered lines at ½× full brightness.

4. Rendering a Solid Triangle Primitive

Solid Triangle (triangular surface): ST P0P1P2 (x0 y0 z0 x1 y1 z1 x2 y2 z2 intensity/color)

4.1 Simple Rendering

4.1.1 Point-Based

Point-based Simple Rendering renders a Solid Triangle primitive by using only one layer of sampling points. The preferred approach to obtain sampling points is to "fill" the triangle line by line. The lines can then be rendered as Line primitives. It controls the gray-scale of the primitive by controlling the density distribution and the size of the sampling points.

First we describe how to fully render a triangle. As in the case of rendering a line, the basic approach to fully render a Solid Triangle is to find just enough sampling points on the triangle so that the resulted Grid Elements will cover the triangle. The preferred steps are:

(1) Finding the optimum number of sampling points for each of the three edges of the triangle, using eqn. (102).

(2) Selecting the edge with most sampling points as the "directional-edge" and the edge with least sampling points as the "base-edge"; locating sampling point positions on both edges. This results in a minimum number of sampling points just enough to fully render the triangle.

Figure 7:
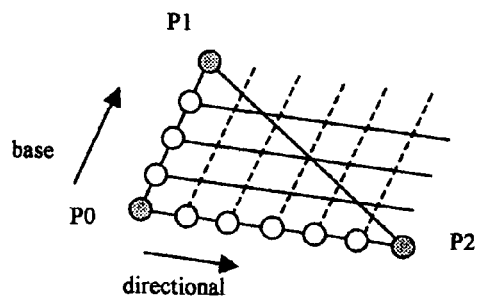
FIG. 7, FIG. 8a-b and FIG. 9a-c illustrate method of Point-based Rendering of a triangular surface by this invention.

(3) Constructing a mesh system over the triangle by conceptually drawing a line from each sampling point position on the base-edge and making the line parallel to the directional-edge, and drawing a line from each sampling point position on the directional-edge and making the line parallel to the base-edge. The intersections of the lines falling within the triangle mark the locations of sampling points to be rendered. See FIG. 7.

(4) Computing sampling points line by line using eqn. (101). The number of sampling points for each line can be determined easily because the mesh lines are parallel to one of the two edges and the mesh sizes on the two edges are known.

(5) Rendering all sampling points. All lines parallel to the directional-edge are rendered at a density same as the directional-edge. All lines parallel to the base-edge are rendered at a density same as the base-edge. Since the directional-edge and the base edge are both fully-rendered, all lines are fully-rendered and hence the point density is optimum in all directions. See FIG. 7.

Figure 8A:
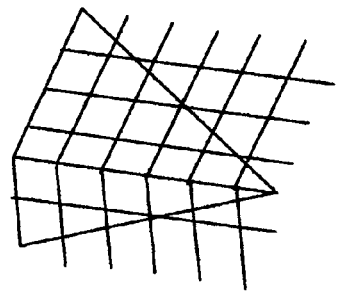
Figure 8B:
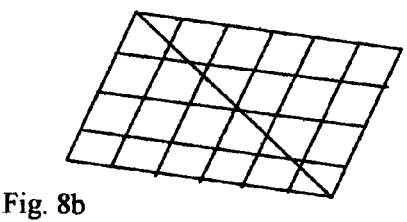

By constructing the rendering mesh based on two different edges of the triangle and setting the optimum mesh size independently in the two directions, the above algorithm gives roughly uniform point density for triangles of different sizes, as illustrated in FIG. 8a. For a parallelogram, comprising two triangles, the point density will be exactly uniform, see FIG. 8b.

To display a triangle with less than full brightness, the total number of sampling points is decreased to match the decreased brightness. A Brightness Ratio can be defined in reference to the brightness when fully-rendered:

$$BR\_st(\text{Brightness Ratio of Solid Triangle}) = Br\_st/Br\_st\_op \qquad (201)$$

where Br_st =target brightness level of the solid triangle to be rendered

Br_st op =brightness level of the solid triangle when fully-rendered (at optimum number of sampling points)

Brightness level of the triangle is proportional to the number of rendered (lighted up) Grid Elements and to the brightness scale of the Grid Element itself, if it has gray scale capacity. Therefore, $$BR\_st = Nge\_st*Bge/(Nge\_st\_op*Bge\_f) \qquad (202)$$

Nge_st=number of Grid Elements to be rendered in the triangle

Nge_st_op=number of Grid Elements in the triangle, if fully-rendered

Bge=brightness level of each rendered Grid Element, if it has brightness scale capacity Bge_f=full-brightness level of a Grid Element, if it has brightness scale capacity The number of Grid Elements in the triangle, if fully-rendered, can be related to the number of sampling points as follows, $$Nge\_st\_op = (\text{Number of sampling points, if fully-rendered})*Fd^2 \qquad (203)$$

Fd is the Pixel Dilating factor of eqn. (102).

The number of sampling points can be determined from Ns_op_b and Ns_op_d as $$\text{Number of sampling points (fully-rendered)} = Ns\_op\_b * Ns\_op\_d/2 \quad (204)$$

Ns_op_b=optimum number of sampling points on the based-edge

Ns_op_d=optimum number of sampling points on the directional-edge

So, $$Nge\_st\_op = Ns\_op\_b * Ns\_op\_d * Fd^2/2 \quad (205)$$

$$Nge\_st = Ns\_b * Ns\_d * n\_pd/2 \quad (206)$$

Ns_b=number of sampling points on the based-edge

Ns_d=number of sampling points on the directional-edge n_pd="dilating number", number of dilated pixels (including the original one) of a point Therefore, $$\begin{aligned} BR\_st = \;& (NS\_b * Ns\_d * n\_pd * Bge)/ \\ & (Ns\_op\_b * Ns\_op\_d * Fd^2 * Bge\_f) \\ = \;& (Ns\_b/Ns\_op\_b) * (Ns\_d/Ns\_op\_d) * \\ & (n\_pd/Fs^2) * (Bge/Bge\_f) \end{aligned} \quad (210)$$

The sampling points should be computed based on the orientation of the Solid Triangle relative to the Gird Element structure. This is because, in general, the Grid Element pitch in the screen sweeping direction dT can be different from dM and dN on screen, and also because pixel dilating does not operate in the dT direction. This affects the selections of optimum sampling spacing for edges. There are three different cases:

Case (1): If the dominant sampling directions of both the base-edge and the directional-edge are z-axis, then per eqn. (102)

Ns_op ∝ Δz/dz_op (Δz is the span of the edge in z direction).

So $$Ns/Ns\_op = dz\_op/dz = dT/dz \quad (212)$$

dz=the spacing for calculating Ns

Eqn. (210) per (212):

$$BR\_st = (dT/dz)^{2*} (n\_pd/Fd^2) * (Bge/Bge\_f) dz/sqrt \\ (n\_pd*Bge/Bge\_f) = dT/(Fd*sqrt(BR\_st)) \quad (214)$$

sqrt [content]: square root of the content

A set of values (dz, n_pd, Bge/Bge_f) satisfying eqn. (214) will be able to render the solid triangle at the target brightness level Br_st=BR*Br_st_op. Once a pixel dilating level n_pd and a pixel brightness level Bge/Bge_f are set, dz can be determined from eqn. (214). This dz can then be used to calculate the corresponding numbers of sampling points on the two edges: Ns_b and Ns_d, using the following equation, similar to eqn. (102):

$$Ns = \text{int}[\text{Max}[|x1-x0|/dx, |y1-y0|/dy, |z1-z0|/dz]] \quad (102A)$$

(For binary pixels with no dilating, n_pd=Fd=Bge=Bge_f=1.)

Case (2): If the dominant sampling directions of both the base-edge and the directional-edge are x- or y-axis, then per eqn. (102)

Ns_op ∝ Δx/dx_op or Δy/dy_op

So $$\begin{aligned} Ns/Ns\_op &= dx\_op/dx = (Fd*dM)/dx \text{ or} \\ &= dy\_op/dy = (Fd*dN)/dy \end{aligned} \quad (216)$$

dx, dy = the new spacing for calculating Ns

In general, dM=dN and we can take dx=dy. So, eqn. (210) per (216):

$$BR\_st = ((Fd*dM)/dx)^{2*}(n\_pd/Fd^2)*(Bge/Bge\_f)dx/ \\ sqrt(n\_pd*Bge/Bge\_f) = dM/sqrt(BR\_st) \quad (218)$$

A set of values (dz, n_pd, Bge/Bge_f) satisfying eqn. (218) will be able to render the solid triangle at the target brightness level. Once a pixel dilating level n_pd and a pixel brightness level Bge/Bge_f are set, (dx, dy) can be determined from eqn. (218). They can then be used to calculate the corresponding numbers of sampling points on the two edges: Ns_b and Ns_d, using eqn. (102A).

Figure 9A:
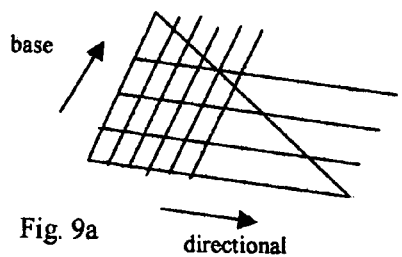
Figure 9B:
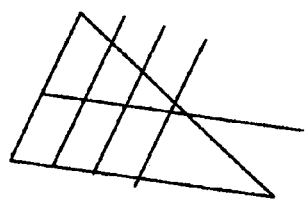
Figure 9C:
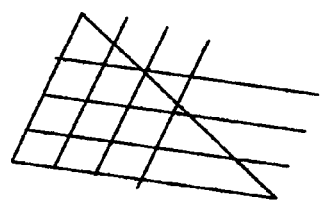

Case (3): One of the two edges has its dominant sampling direction in z-axis and the other in x- or y-axis. If dT is not equal to dx or dy, then rendering of the triangle could have non-even spacing in the two rendering directions. At optimum point density, i.e. fully-rendered, the points can be rendered with "non-square" mesh, as shown in FIG. 9a because the Grid Element scale itself may not be uniform. This is not a problem since the point density is optimum. But this can be a problem if we increase point spacing. If the point spacing in the two directions are increased by the same factor, then this "non-square" mesh can show up and give the triangle undesirable pattern, as shown in FIG. 9b. Therefore, in "low point density" situation, we should render the triangle with roughly "square" mesh at any point density, as shown in FIG. 9c, while taking the effect of non-uniform Grid Element scale into consideration. The following procedure will do.

Combining eqns. (210), (212) and (216) gives:

$$BR\_st = (dT/dz)*((Fd*dM)/dx)*(n\_pd/Fd^2)*(Bge/ \\ Bge\_f) dz*dx/(n\_pd*Bge/Bge\_f) = dM*dT/ \\ (Fd*BR\_st) \quad (220)$$

If dx<dT, then take dz=dT. Then per eqn. (220)

$$dx/(n\_pd*Bge/Bge\_f) = dM/(Fd*BR\_st) \quad (222)$$

The corresponding condition dx<dT is therefore $$dx = (n\_pd*Bge/Bge\_f)*dM/(Fd*BR\_st) < dT \; BR\_st > \\ (n\_pd*Bge/Bge\_f)*dM/(Fd*dT) \quad (224)$$

In other words, this means when eqn. (224) is satisfied, use dz=dT and dx calculated from eqn. (222) to calculate the corresponding number of sampling points, by eqn. (102A).

If dx>=dT, then take dz=dx. So per eqn (220)

$$dx/sqrt(n\_pd*Bge/Bge\_f) = sqrt(dM*dT/(Fd*BR\_st)) \quad (226)$$

The corresponding condition is $$BR\_st \leq (n\_pd*Bge/Bge\_f)*dM/(Fd*dT) \quad (228)$$

In other words, this means when eqn. (228) is satisfied, use dz=dx as calculated from (226) to calculate the corresponding number of sampling points, by eqn. (102A).

4.1.2 Intersection-Based Rendering

Intersection-based Simple Rendering renders a Solid Triangle primitive by calculating the intersections of only one triangular surface with the slicing frames. It controls the gray-scale of the primitive by controlling the pixel density of the intersection bitmaps on the slicing frame.

Figure 10:
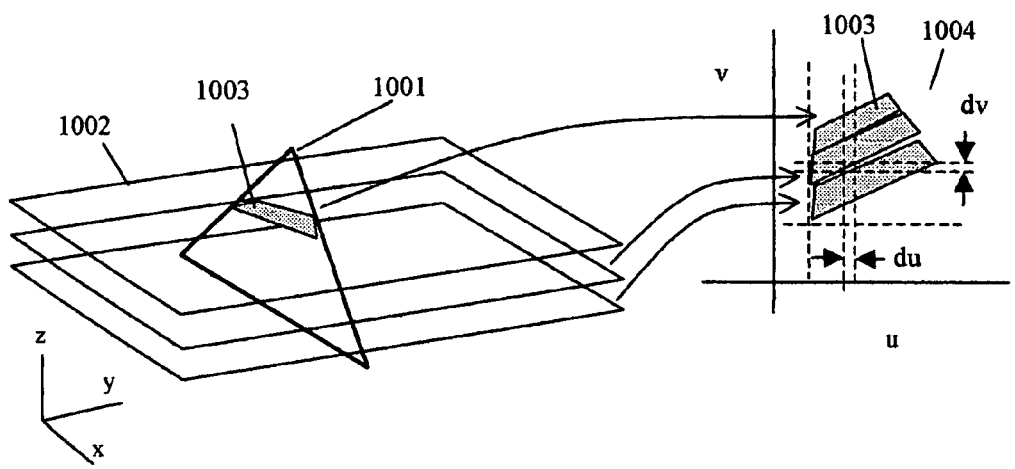
FIG. 10 illustrates method of Intersection-based Rendering of a triangular surface by this invention.

In rendering a line, the Composite Bitmap is organized as a 1-D bit string, as described previously. In rendering a ST (Solid Triangle) 1001, each intersection with a frame slice 1002 is a small bitmap 1003 comprising pixels of the frame, as illustrated in FIG. 10. Stitching together all the small bitmaps of intersection forms a 2D Composite Bitmap 1004.

The concept of Brightness Ratio and equations (201) and (202) still apply. And the fully-rendered triangle is still used as a reference. Similar to the Line case, the number of Grid Elements in the triangle Nge_st is basically the number of pixels in the Composite Bitmap Np_CBM st.

Nge_st=Np_CBM_st=number of rendered pixels on Composite Bitmap Nge_st_op=Np_CBM_st_f (if fully-rendered)

For convenience, the Composite Bitmap is represented on u-v plane, as shown in FIG. 10. Rendering is done in two directions: u- and v-directions. To render at full-brightness (fully-filled), the spacing of rendered pixels in the two directions is set to the pitch of the projected pixels:

du_op=dv_op=dL_p_op=dM=dN.

Np_CBM_st is inversely proportional to the square of the rendering spacing dL_p:

Np_CBM_st $\propto (1/\text{dL\_p})^2$

Therefore, $$Nge\_st/Nge\_st\_op=Np\_CBM\_st/Np\_CBM\_st\_f=(dL\_p\_op/dL\_p)^2 \quad (240)$$

Per (240), eqn. (202) becomes $$BR\_st=(dL\_p\_op/dL\_p)^2 *(Bge/Bge\_f) \quad (242)$$

Since dL_p_op=dM=dN, $$dL\_p/sqrt(Bge/Bge\_f)=dM/sqrt(BR\_st) \quad (244)$$

Eqn. (244) gives the desired spacing of rendered pixels to re-render a Solid Triangle's Composite Bitmap to give the targeted brightness ratio BR_st. If the pixel has no gray-scale capacity, i.e. Bge/Bge_f=1, then $(dL\_p)^2$ is simply inversely proportional to BR_st. Once dL_p is determined, the following two steps complete the rendering:

(1) Re-render the Composite Bitmap according to the new spacing dL_p. Remove pixels that do not match the new spacing.

(2) From the original, fully-filled small bitmaps of intersection, remove the pixels corresponding to those removed in step (1). These revised small bitmaps of intersection now has the target brightness ratio of BR_st.

4.2 Multi-Layer Rendering

For any specific Solid Triangle applying Simple Rendering, the total number of Grid Elements at full-rendering is fixed. This number limits the number of brightness levels that can be displayed and perceived in practice. The more Grid Elements we have in a Solid Triangle, the more brightness levels can be displayed. By Point-based rendering, Pixel Dilating can somewhat increase this number. By Intersection-based rendering, one can deliberately increase the size (area) of the bitmap of intersection at each frame slice to increase this number. However, both methods could distort the original shape of the Solid Triangle too much if the dilating of points or bitmaps becomes too large. They therefore have limited effect. In addition, if the triangle lies on x-y plane, then none of the two methods will work.

Figures 11A, 11B:
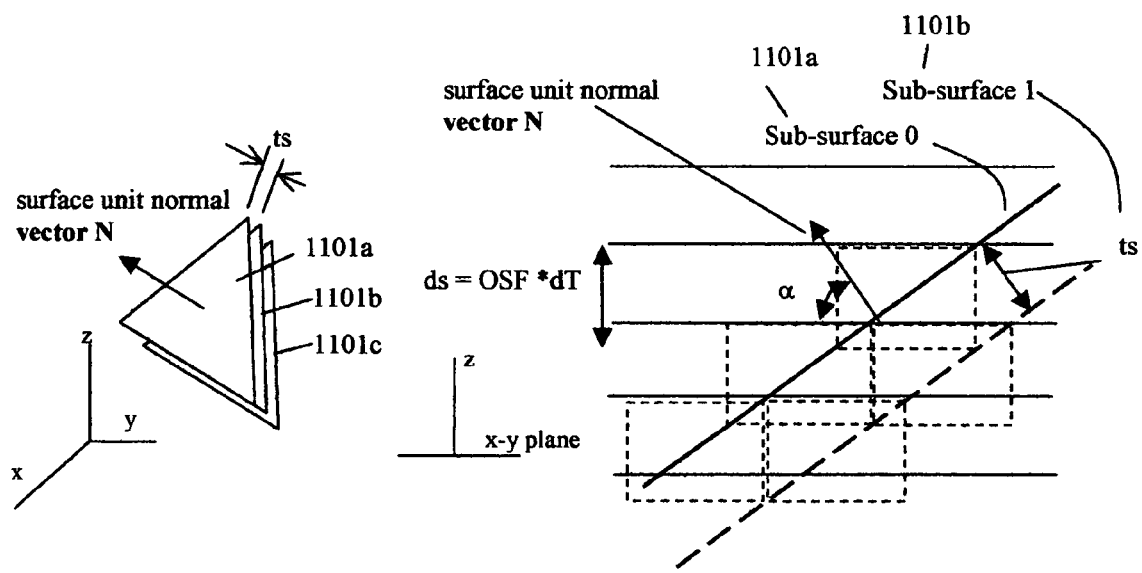
FIG. 11a-b illustrates Multi-layer Rendering of a triangular surface by this invention.

Multi-layer Rendering, or Multi-sub-surfaces Rendering, uses one or more triangular surfaces, each called a Sub-surface, to render one Solid Triangle. FIG. 11a illustrates the idea. The principle is to closely stack a number of Sub-surfaces, 1101a-1101c, together so that visually they appear to be one Solid Triangle, but practically more Grid Elements can be used to express more levels of brightness while there is minimum distortion to the original shape.

Assuming NL sub-surfaces are used and the target Brightness Ratio of the Solid Triangle is BR_ms, the following procedure determines how to render each sub-surface. The concept of Brightness Ratio and equation (201) and (202) still apply. But, for clarity, eqn. (201) is re-written for the multi-sub-surface case as $$BR\_ms(\text{Brightness Ratio})=Br\_ms/Br\_ms\_op \quad (301)$$

wherein Br_ms=target brightness level of the solid triangle to be rendered

Br_ms_op=brightness level of the solid triangle when fully-rendered.

$$Br\_ms\_op=NL*Nge\_ss\_op*Bge\_f$$

wherein Nge_ss_op=number of Grid Elements in one sub-surface, if fully-rendered

Therefore, $$BR\_ms = Nge\_ms * Bge / (NL * Nge\_ss\_op * Bge\_f) \quad (302)$$

wherein

Mge_ms = number of Grid Elements to be rendered in the triangle
       = sum of numbers of rendered Grid Elements in all NL sub-surfaces.

From eqn. (302), we see that the sum of sub-surface brightness ratios should equal the brightness ratio of the Solid Triangle, i.e.

$$BR\_ms=BR\_ss\_0+BR\_ss\_1+\ldots+BR\_ss(NL-1) \quad (304)$$

In general, any combination of sub-surface brightness ratios satisfying eqn. (304) will give similar results. But the following is the most convenient way:

$$\begin{array}{l} \text{If BR\_ms is between 0 and } 1/NL, \text{ then} \\ \quad \text{- use only sub-surface \#0; render it at brightness ratio =} \\ \quad \text{BR\_ms} \\ \text{If BR\_ms is between } 1/NL \text{ and } 2/NL, \text{ then} \\ \quad \text{- fully fill sub-surface \#0} \\ \quad \text{- render sub-surface \#1 at brightness ratio =} \\ \quad (\text{BR\_ms} - 1/NL) \\ \text{If BR\_ms is between } (NL-1)/NL \text{ and 1, then} \\ \quad \text{- fully fill sub-surfaces \#0 to \#}(NL-2) \\ \quad \text{- render sub-surface \#}(NL-1) \text{ at brightness ratio =} \\ \quad \text{BR\_ms} - (NL-1)/NL \end{array} \quad (303)$$

Note that each sub-surface is one Solid Triangle of the same size, shape and orientation as the original Solid Triangle to be rendered. Brightness Ratio of each sub-surface BR_ss is also defined the same way as BR_st So, a sub-surface can be rendered exactly the same way as rendering a Solid Triangle, either by Point-based or by Intersection-based scheme.

The spacing between adjacent two sub-surfaces ts has a preferred minimum value that prevents overlapping Grid Elements on the same frame. As illustrated in FIG. 11b, $$ts = ds * \sin \alpha$$

wherein ds=dT*OSF (Over-sampling factor)
  dT is frame interval (or Grid Element scale in z direction);
  α is the angle between the surface normal and the horizon.

For a Solid Triangle with a unit normal vector N=[nx, ny, nz], $$ts = ds * abs(nz) \quad (505)$$

When α becomes small, ts becomes small. If ts by eqn. (505) becomes smaller than dM*Fd, then the following minimum value should be used:

$$ts = dM * Fd \quad (505A)$$

Sub-surfaces can be located along the direction of the unit normal vector of the Solid Triangle by computing their corner vertices:

$$(x,y,z)j,k = (xj - k*ts*nx, \; yj - k*ts*ny, \; zj - k*ts*nz) \quad (507)$$

wherein (xj, yj, zj) is the original corner vertices of the ST, j=0, 1, 2 (3 corner vertices);
  k=0, 1, ... NL−1 is sub-surface index.

5. Texture Mapping

This chapter summaries the principle and algorithms for rendering a surface with a given bitmap texture, combining the use of pixel dilating, point density control, and multi-layer color scheme.

5.1 Preparation

Figure 12A:
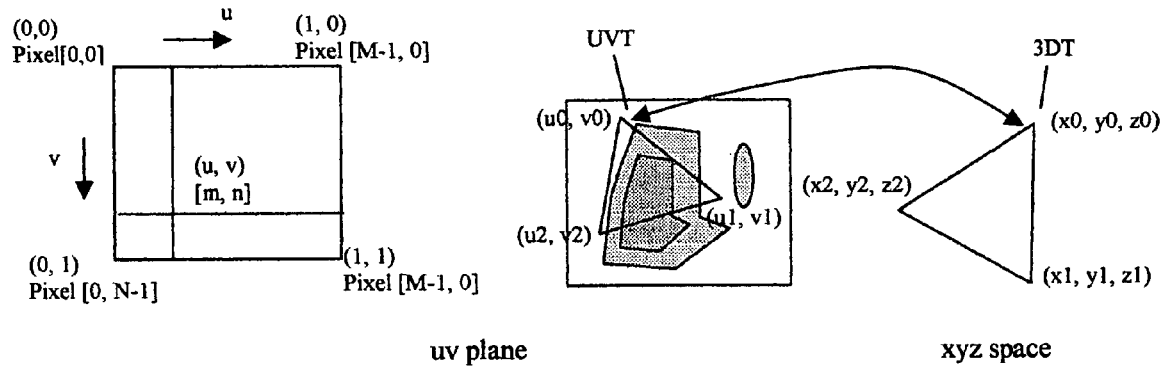

As shown in FIG. 12a, a 2D coordinate system (u, v) is defined to cover the whole 2D bitmap. Coordinates (u, v) has a full-range from (0, 0) to (1, 1). The bitmap has M pixels in the u direction and N pixels in the v direction. Each pixel can be located by integer indices [m, n], with m=0, 1, 2 ... M−1 and n=0, 1, 2 ... N−1. The location of each pixel [m, n] can therefore map to the (u, v) coordinates.

The texture mapping of the bitmap to a solid triangle is defined by a matching 2D triangle on the uv plane. The matching triangle (called UVT for clarity) matches the 3D solid triangle (called 3DT for clarity) by the three corner vertices. The bitmap area covered by the UVT is to be mapped to the 3DT by linear proportion. A group of 3DTs 1211 can therefore be mapped by a group of UVTs 1210 covering the desired bitmap areas, as illustrated in FIG. 12b.

5.2 General Approach

The color texture map is mapped and rendered field by field. That is, the color texture map is first separated into three field maps (R field, G field and B field). Each field map is therefore a monochromatic image map and can be rendered by a same procedure. The optics of a V3D display will then recombine the three fields and presents the color texture map. The basic procedure to render a monochromatic texture-mapped Solid Triangle is as follows:

(1) Divide the full intensity scale of the texture map into a number of different intensity ranges. Each intensity range therefore maps to a different region on the texture map. Because the texture map contains pixels and each pixel has an intensity value, by dividing the full intensity scale into many ranges, each intensity range will correspond to many pixels that have their intensity values falling within that specific intensity range. Pixels of the same intensity range therefore form a region (an area) on the texture map. Different intensity range therefore corresponds to different regions.

(2) Each region on the texture map maps to a corresponding region on the Solid Triangle, by the UVT to 3DT mapping described previously, that is, by linear proportion.

(3) Assign a brightness ratio to each corresponding region on the Solid Triangle based on the intensity range that corresponds to that region. The brightness ratio is defined, as before, as the ratio of desired number of display elements to the number of display elements at full brightness.

(4) Render each corresponding region of the Solid Triangle with a different distribution density of display elements to represent different brightness ratio.

Point-based Rendering is the preferred method. Basically, each corresponding region of the solid triangle is rendered under a mesh system that gives the desired brightness ratio to the whole triangle, but sampling points are placed only in the corresponding region.

5.3 Detailed Steps

The detailed steps are:

Step 1: From the bitmap, get R G B intensity values of each pixel and set up three pixel data structures:
  Pixel_Rfield[m][n].intensity=FI (field intensity) R;
  Pixel_Gfield[m][n].intensity=FI G;
  Pixel_Bfield[m][n].intensity=FI B;

Step 2: For each field, divide the intensity scale into Nrgn regions, 1250. The division does not have to be between intensity 0 and FI_full. If desired, division can be set between a FI_low and a FI_high. (Note: Highest Nrgn is FI_full, i.e. 1 gray level for 1 region.) See FIG. 12c.

Step 3: For each field, assign each pixel to one of the Nrgn "regions" according to its intensity value FI. For region i, (i=0, 1, 2 ... Nrgn−1), its region index is
  i=(int) [((FI−FI_low)/(FI_high−FI_low))*Nrgn]
    (int) [content]: operation of taking a minimum integer smaller than "content"

Setup the region index data structure, (using R filed as example)

$$\text{Pixel\_Rfield}[m][n].\text{region\_idx}=i; \quad (700A)$$

Step 4: Render the ST, region by region. For region i, take the lower bound intensity of this region to find the corresponding brightness ratio BR [i], by linear interpolation per FIG. 12c:

$$\begin{aligned} BR[i] &= BR\_low + (BR\_high - BR\_low) * \quad (702) \\ &\quad (int)[(FI - FI\_low)/(FI\_high - FI\_low)] \\ &= BR\_low + (BR\_high - BR\_low) * i/Nrgn \end{aligned}$$

This is the brightness ratio BR to be used to render this region in the triangle. Once BR is determined, we can then use either Simple Rendering or Multi-layer Rendering described previously to render this region of the triangle. If by Multi-layer Rendering, the brightness ratio of each sub-surface is to be further determined by eqn. (303).

The detailed steps for rendering a region i of known brightness ratio in a monochromatic texture mapped triangle are:

(Step 4.1) Determine the numbers of sampling points on the base-edge (Ns_b[i]+1) and on the directional-edge (Ns_d[i]+1) of the 3D solid triangle (3DT), following the same steps described in section 4.1.1 if applying Simple Rendering and in section 4.2 if applying Multi-layer Rendering.

(Step 4.2) Apply Ns_b[i] and Ns_d[i] to the triangle's matching TVT and compute sampling points (u, v) j,k, on the UVT, point by point in sequence. The computation of sampling points is the same as before and uses eqn. (101) for each grid line except that (u, v) replaces (x, y) and z coordinate is zero. The computation sequence is first along base-edge (j) and for every j the computation progresses along the directional-edge (k). See FIG. 12d.

(Step 4.3) Check each computed sampling point (u, v) j, k to see if it belongs to this current region i. Only points belonging to region i will be rendered at the current point density. This is to map the (u, v) point to its pixel array index [m][n], and then check the data structure to see if Pixel_Rfield[m][n].region idx=i?

If not, then compute the next (u, v) sampling point.

If yes, then find the matching point (x, y, z) j, k of this (u, v) j, k and render it on the 3DT. This is simply to apply eqn. (101) to the 3DT using this very (j,k) index as follows:

$$(x, y, z)j, k = (xj + k^*(xc - xb)/\text{Ns\_d}[i],$$
$$yj + k^*(yc - yb)/\text{Ns\_d}[i],$$
$$zj + k^*(zc - zb)/\text{Ns\_d}[i])$$

wherein $$(xj, yj, zj) = (xa + j^*(xb - xa)/\text{Ns\_b}[i],$$
$$ya + j^*(yb - ya)/\text{Ns\_b}[i],$$
$$za + j^*(zb - za)/\text{Ns\_b}[i])$$

and the base-edge of this 3DT is from (xa, ya, za) to (xb, yb, zb), the directional-edge from (xb, yb, zb) to (xc, yc, zc).

In this way, region by region, the texture bitmap can be mapped onto the surface of a solid triangle. FIG. 12e illustrates a triangle with three regions of different brightness (intensity) and hence has three different mesh sizes for point rendering (that is, three different densities of distribution of points). The data structure of region index is used in order to efficiently check if a sampling point is within the region to be rendered.

6. Rendering 3D Volume—Voxel Mapping Method

This chapter describes the principle and the algorithm of using points to render a 3D volume with distributed gray scale (or a similar property).

6.1 Preparation

Referring to FIG. 13a, typically, the 3D volume to be rendered 1360 is in the form of structured, orthogonal volumetric 3D data. It has basically C bitmaps stacked together. Each layer of the stack is a A by B bitmap. A, B and C are integers. The total number of voxels is therefore A×B×C. Each data voxel can be located by three integer indices (a, b, c), where a—the horizontal direction on a data layer; from pixel index (0, b) to (A-1, b);

b—the vertical direction on a data layer; from pixel index (a, 0) to (a, B-1);

c—the stacking direction; from data layer index #0 to #C-1

Referring to FIG. 13b, a 3D Box 1380 is defined to just enclose the 3D volume. Four corner points are defined:

P0 (x0, y0, z0)—corresponds to the corner point at voxel (0, 0, 0)

P1 (x1, y1, z1)—corresponds to the corner point at voxel (A-1, 0, 0)

P2 (x2, y2, z2)—corresponds to the corner point at voxel (0, B-1, 0)

P3 (x3, y3, z3)—corresponds to the corner point at voxel (0, 0, C-1)

By setting the coordinates of the four corner points, the position and orientation of the 3D volume w.r.t. the xyz coordinate frame system can be determined. The four corner points form three orthogonal "corner vectors": vector P0P1, vector P0P2 and vector P0P3.

The method of Voxel Mapping is to use sampling points in the 3D Box to render the distributed gray scale (or a similar property) of the 3D volume.

6.2 General Approach

This algorithm basically follows the region by region approach of rendering one 3DT in texture mapping, except applying the approach in 3D (3 directions in space) and over the whole 3D volume box. The rendering is done field by field. That is, the 3D volume is first separated into three fields (R field, G field and B field). Each field is therefore a monochromatic volume and can be rendered by a same procedure. The optics of a V3D display will then recombine the three fields and presents the color volume. The basic approach to render a single-field 3D volume is first to separate the 3D volume into a number of regions, each region of a different intensity (brightness) range. From the intensity range of each region, a corresponding brightness ratio of that region can be defined. For each region of known brightness ratio, the numbers of sampling points in the three orthogonal directions can be determined. Once the number of sampling points in each direction is determined, then the "mesh size" (or grid size) of that region can be determined. The 3D box is then rendered, region by region, according to the corresponding brightness ratio. Basically, each region of the 3D volume is rendered under a mesh system that gives the desired brightness ratio to the whole 3D box, but sampling points are placed only in the corresponding region.

6.3 Rendering a 3D Box of a Brightness Ratio BR_Box

The procedure for rendering a 3D box of a given Brightness Ratio is fundamental to the method of Voxel Mapping.

The Brightness Ratio of a 3D box:

$$BR\_box = Br\_box/Br\_box\_op \quad (801)$$

where Br_box=target brightness level of the 3D box to be rendered

Br_box_op=brightness level of the 3D box when filly-rendered (at optimum number of sampling points)

Brightness level of the 3D box is proportional to the number of rendered Lighted up) Grid Elements and to the brightness scale of the Grid Element itself, if it has gray scale capacity. Therefore, $$BR\_box = Nge\_box * Bge/(Nge\_box\_op * Bge\_f) \quad (802)$$

Nge_box=number of Grid Elements to be rendered in the 3D box

Nge_box_op=number of Grid Elements in the 3D box, if fully-rendered

Bge=brightness level of each rendered Grid Element, if it has brightness scale capacity Bge_f=full-brightness level of a Grid Element, if it has brightness scale capacity The number of Grid Elements in the 3D box, if fully-rendered, can be related to the number of sampling points as follows, $$Nge\_box\_op = (\text{Number of sampling points, if fully-rendered}) * Fd^2 \quad (803)$$

Fd is the Pixel Dilating factor of eqn. (102).

$$\text{Number of sampling points (fully-rendered)} = Ns\_op\_a * Ns\_op\_b * Ns\_op\_c \quad (804)$$

Ns_op_a=optimum number of sampling points on edge P0P1
Ns_op_b=optimum number of sampling points on edge P0P2
Ns_op_c=optimum number of sampling points on edge P0P3

So, $$Nge\_box\_op = Ns\_op\_a * Ns\_op\_b * Ns\_op\_c * Fd^2 \quad (805)$$

In general, $$Nge\_box = Ns\_a * Ns\_b * Ns\_c * n\_pd \quad (806)$$

Ns_a=number of sampling points on edge P0P1
Ns_b=number of sampling points on edge P0P2
Ns_c=number of sampling points on edge P0P3
n_pd=number of dilated pixels (including the original one) of a point Therefore, $$\begin{aligned} BR\_box &= (Ns\_a * Ns\_b * Ns\_c * n\_pd * Bge) / \\ & \quad (Ns\_op\_m * Ns\_op\_n * Ns\_op\_q * Fd^2 * Bge\_f) \\ &= (Ns\_a / Ns\_op\_a) * (Ns\_b / Ns\_op\_b) * \\ & \quad (Ns\_c / Ns\_op\_c) * (n\_pd / Fd^2) * (Bge / Bge\_f) \end{aligned} \quad (810)$$

The sampling points can be computed, depending on the orientation of the 3D box relative to the Gird Element structure. This is because, in general, the Grid Element pitch in the screen sweeping direction dT can be different from d4 and dN on screen, and also because pixel dilating does not operate in the dT direction. This affects the selections of optimum sampling spacing. There are four different cases:

Case (1): If the dominant sampling directions of all the 3 orthogonal edges are z-axis, then per eqn. (102)

$$Ns\_op \propto \Delta z / dz\_op \quad (\Delta z \text{ is the span of the edge in z direction}).$$

So $$Ns / Ns\_op = dz\_op / dz = dT / dz \quad (812)$$

dz=the new spacing for calculating Ns

Eqn. (810) per (812):

$$BR\_box = (dT/dz)^3 * (n\_pd/Fd^2) * (Bge/Bge\_f) dz / (n\_pd * Bge/Bge\_f)^{1/3} = dT/(Fd^2 * BR\_box)^{1/3} \quad (814)$$

A set of values (dz, n_pd, Bge/Bge_f) satisfying eqn. (814) will be able to render the 3D box at the target brightness level Br_box=BR*Br_box_op. Once a pixel dilating level n_pd and a pixel brightness level Bge/Bge_f are set, dz can be determined from eqn. (814). This dz can then be used to calculate the corresponding numbers of sampling points on the 3 orthogonal edges using eqn. (102A). (For binary pixels with no dilating, n_pd=Fd=Bge=Bge_f=1.)

Case (2): If the dominant sampling directions of all the 3 orthogonal edges are x- or y-axis, then per eqn. (102)

$$Ns\_op \propto \Delta x / dx\_op \text{ or } \Delta y / dy\_op \quad (816)$$

So $$\begin{aligned} Ns / Ns\_op &= dx\_op / dx = (Fd * dM) / dx \text{ or} \\ &= dy\_op / dy = (Fd * dN) / dy \end{aligned}$$

dx, dy = the new spacing for calculating Ns

In general, dM=dN and we can take dx=dy. So, eqn. (810) per (816):

$$BR\_box = ((Fd * dM / dx)^3 * (n\_pd / Fd^2) * (Bge / Bge\_f) dx / (n\_pd * Bge / Bge\_f)^{1/3} = dM * (Fd / BR\_box)^{1/3} \quad (818)$$

A set of values (dz, n_pd, Bge/Bge_f) satisfying eqn. (818) will be able to render the 3D box at the target brightness level. Once a pixel dilating level n_pd and a pixel brightness level Bge/Bge_f are set, (dx, dy) can be determined from eqn. (818). They can then be used to calculate the corresponding numbers of sampling points on the 3 edges, using eqn. (102A).

Case (3): One of the 3 edges has its dominant sampling direction in z-axis and the others in x- or y-axis. This should be the most common case.

Per eqns. (810), (812) and (816):

$$BR\_box = (dT/dz) * ((Fd * dM)/dx)^2 * (n\_pd/Fd^2) * (Bge/Bge\_f) dz * (dx)^2 / (n\_pd * Bge/Bge\_f) = dM * dT / BR\_box \quad (820)$$

If dx<dT, then take dz=dT. Then per eqn. (820)

$$(dx)^2 / (n\_pd * Bge / Bge\_f) = dN / BR\_box \quad (822)$$

The corresponding condition dx<dT is therefore $$(dx)^2 = (n\_pd * Bge / Bge\_f) * dM / BR\_box < (dT)^2 BR\_box > (n\_pd * Bge / Bge\_f) * dM / (dT)^2 \quad (824)$$

In other words, this means when eqn. (824) is satisfied, use dz=dT and dx calculated from eqn. (822) to calculate the numbers of sampling points on the corresponding edges, by eqn. (102A).

If dx>=dT, then take dz=dx. So per eqn. (820)

$$(dx)^3 / (n\_pd * Bge / Bge\_f) = dM * dT / BR\_box \quad (826)$$

The corresponding condition is $$BR\_box \, z, 1 (n\_pd * Bge / Bge\_f) * dM / (dT)^2 \quad (828)$$

In other words, this means when eqn. (828) is satisfied, use dz=dx as calculated from (826) to calculate the numbers of sampling points on corresponding edges, by eqn. (102A).

Case (4): One of the 3 edges has its dominant sampling direction in x- or y-axis and the others in z-axis. Per eqns. (810), (812) and (816):

$$BR\_box = (dT/dz)^2 * ((Fd * dM)/dx) * (n\_pd/Fd^2) * (Bge/Bge\_f)(dz)^2 * dx / (n\_pd * Bge/Bge\_f) = dM * (dT)^2 / (Fd * BR\_box) \quad (830)$$

If dx<dT, then take dz=dT. Then per eqn. (830)

$$dx / (n\_pd * Bge / Bge\_f) = dM / (Fd * BR\_box) \quad (832)$$

The corresponding condition dx<dT is therefore $$dx = (n\_pd * Bge/Bge\_f) * dM/(Fd * BR\_box) < (dT)^2 \text{ or}$$
$$BR\_box > (n\_pd * Bge/Bge\_f) * dM/(Fd * (dT)^2) \quad (834)$$

In other words, this means when eqn. (834) is satisfied, use dz=dT and dx calculated from eqn. (832) to calculate the numbers of sampling points on the corresponding edges, by eqn. (102A).

If dx>=dT, then take dz=dx. So per eqn. (830)

$$(dx)^3(n\_pd * Bge/Bge\_f) = dM * (dT)^2/(Fd * BR\_box) \quad (836)$$

The corresponding condition dx>=dT is $$(dx)^3 = (n\_pd * Bge/Bge\_f) * dM * (dT)^2/(Fd * BR\_box) >=$$
$$(dT)^3 BR\_box <= (n\_pd * Bge/Bge\_f) * dM/dT \quad (838)$$

In other words, this means when eqn. (838) is satisfied, use dz=dx as calculated from (836) to calculate the numbers of sampling points on corresponding edges, by eqn. (102A).

6.4 Mapping between Voxel Indices and Point Indices

This section describes the mapping relation between the voxels of the 3D volume, using indices (a, b, c), and the mesh points in the 3D box, using indices (i, j, k). The voxel indices (a, b, c) is from (0, 0, 0) to (A-1, B-1, C-1), as described previously. The mesh point indices (i, j, k) is from (0, 0, 0) to (Ns_a, Ns_b, Ns_c), which follows the index definition used in eqn (101). We use direction "a" as an example. The same principle applies to the other two directions, "b" and "c".

(Case A) When rendering point spacing dLa>voxel pitch dA, that is, Ns_a<A FIG. 14*a* illustrates the situation. 1401 represents the mesh grid. An index "i" represents a point location of a mesh point (i.e. intersection of mesh lines). 1402 represents the voxel grid. An index "a" represents a segment because the voxel has a size. In this case, we should compute rendering points from (i, j, k) space for efficiency. The mapping is to see which segment "a(i)" the point "i" maps to. The mapping can be done in the index space by proportion, without the need of xyz dimension.

$$(i-0)/(Ns\_a-0) = (a(i)-0)/A$$

so, $$\left.\begin{array}{l} a(i) = int[A * i/Ns\_a]. \\ \text{Similarly, } b(j) = int[B * j/Ns\_b] \\ c(k) = int[C * k/Ns\_c]. \end{array}\right\} \quad (710)$$

(Case B) When rendering point spacing dLa=<voxel pitch dA, that is Ns_a>=A. FIG. 14*b* illustrates the situation. In this case, we should compute rendering points from (a, b, c) space for efficiency. In each region, we process only voxels of the right intensity. The mapping is to see which points are covered by segment "a". The mapping can again be done in the index space by proportion, without the need of xyz dimension.

The left (small) end of segment "a", 1403, maps to location ia in the i space with a segment length L_a, 1404.

$$\left.\begin{array}{l} (ia - 0) = (Ns\_a - 0) * a/A \\ L\_a = Ns\_a * 1/A \\ \text{L\_a covers the following } i \text{ points:} \\ \text{from } i = int[ia + 1] \text{ to } i = int[ia + L\_a] \\ \text{Similarly, } b \text{ maps to } jb \text{ with a segment length L\_b:} \\ jb = Ns\_b * b/B \\ L\_b = Ns\_b/B \\ \text{It covers the following } j \text{ points:} \\ \text{from } j = int[jb + 1] \text{ to } j = int[jb + L\_b] \\ \text{And } c \text{ maps to } kc \text{ with a segment length L\_c:} \\ kc = Ns\_c * c/C \\ L\_c = Ns\_c/C \\ \text{It covers the following } k \text{ points:} \\ \text{from } k = int[kc + 1] \text{ to } k = int[kc + L\_c] \end{array}\right\} \quad (711)$$

6.5 Detailed Steps

The detailed steps are:

Step 1: From the 3D volume, get R G B intensity values of each voxel and set up 3 voxel data structures:
Voxel_Rfield[a][b][c].intensity=FI (field intensity) R;
Voxel_Gfield[a][b][c].intensity=FI G;
Voxel_Bfield[a][b][c].intensity=FI B, Step 2: For each field, divide the intensity scale into Nrgn regions. The division does not have to be between intensity 0 and FI_full. If desired, division can be set between FI_low and FI_high. (Note: Highest Nrgn is FI_full, i.e. 1 gray level for 1 region.) See FIG. 12*c*.

Step 3: For each field, assign each voxel to one of the Nrgn "regions" according to its intensity level FI:
Region r, (r=0, 1, 2 . . . Nrgn−1):
  r=(int)[((FI−FI_low)/(FI_high−FI_low))*Nrgn]

Setup the region index data structure, (using R field as example)
Voxel_field[a][b][c].region_idx=r;

In addition, setup a voxel group data structure and collect the indices of voxels belonging to the same region (same range of intensity). That is, data structure Voxel_Group[r] contains all voxels (a, b ,c) belonging to the same region r.

Step 4: Render the 3D box? region by region. For region r, the lower bound intensity of this region is
FI=r*(FI_high−FI_low)/Nrgn So the corresponding brightness ratio BR [r] is $$BR[r] = int[BR\_low + (BR\_high - BR\_low) * (r/Nrgn - FI\_low/(FI\_high - FI\_low))] \quad (702)$$

This is the brightness ratio BR to be used to render this region in the 3D Box.

The detailed steps for rendering a region "r" of known brightness ratio BR [r] in a single field 3D volume box are:

(Step 4.1) Determining the numbers of sampling points on each of the 3 orthogonal edges respectively: Ns_a, Ns_b and Ns_c, as described in section 6.3.

(Step 4.2) Checking:
If Ns_a<A, Ns_b<B and Ns_c<C, then sampling points should be computed from the (i, j, k) space for efficiency, as explained in section 6.4 (Case A). Go to (Step 4.3).
Else, sampling points should be computed from (a, b, c). Go to (Step 4.4).

(Step 4.3) Computing sampling points from (i, j, k) space to (a, b, c) space. First run through point indice (i, j, k) to find each mapped voxel location (a, b, c) by eqn. (710), and check each mapped voxel to see if it belongs to this region r, using the data structure established in Step 1. Only points with indices mapped to voxels belonging to this region "r" should be rendered. A sampling point $(x, y, z)_{i,j,k}$ can be computed by the following equations:

$$(x, y, z)_{i,j,k} = (x_{i,j,0} + k*(x3 - x0)/Ns\_c, \quad (600)$$
$$y_{i,j,0} + k*(y3 - y0)/Ns\_c,$$
$$z_{i,j,0} + k*(z3 - z0)/Ns\_c)$$
$$\text{wherein } (x, y, z)_{i,j,0} = (x_{i,0,0} + j*(x2 - x0)/Ns\_b,$$
$$y_{i,0,0} + j*(y2 - y0)/Ns\_b,$$
$$z_{i,0,0} + j*(z2 - z0)/Ns\_b)$$
$$\text{wherein } (x, y, z)_{i,0,0} = (x0 + i*(x1 - x0)/Ns\_a,$$
$$y0 + i*(y1 - y0)/Ns\_a,$$
$$z0 + i*(z1 - z0)/Ns\_a)$$

(Step 4.4) Computing sampling points from (a, b, c) space to (i, j, k) space. First locate each voxel within this region "r", from the pre-defined data structure Voxel_Group [r]. For each of those voxels, find the indices (ia, jb, kc) of the points mapped by this voxel, by eqn. (711). Render these mapped points of each voxel in the region, by eqn. (600) with (x, y, z) ia, jb, kc.

7. For Rotating Plane Type V3D Displays

The algorithms described so far use the example of a volumetric 3D display of FIG. 1. If the volumetric display is based on a flat display panel (or screen) revolving about an axis parallel to and passing through its own surface, called "rotating screen type" for simplicity, then a slight adjustment to the parameter dT is needed. Examples include the systems described in FIG. 1 of Tsao et al. U.S. Pat. No. 5,754,147 and in R. K. Dorval et. al. U.S. Pat. No. 6,554,430, which is incorporated herein by reference.

Figure 15A:
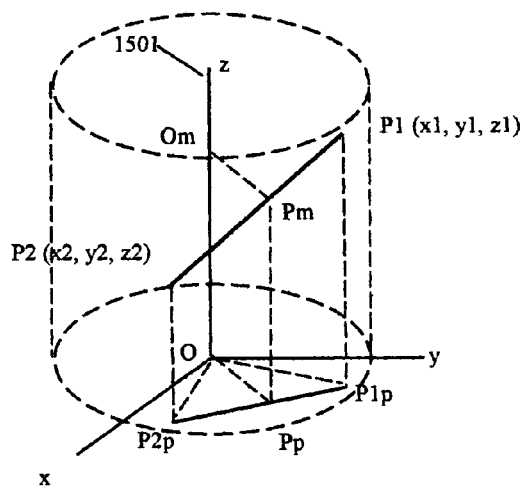
FIG. 15a-b, FIG. 16a-b and FIG. 17a-c illustrate method of determining dT and sub-surface spacing in a system based on rotating display plane.
Figure 15B:
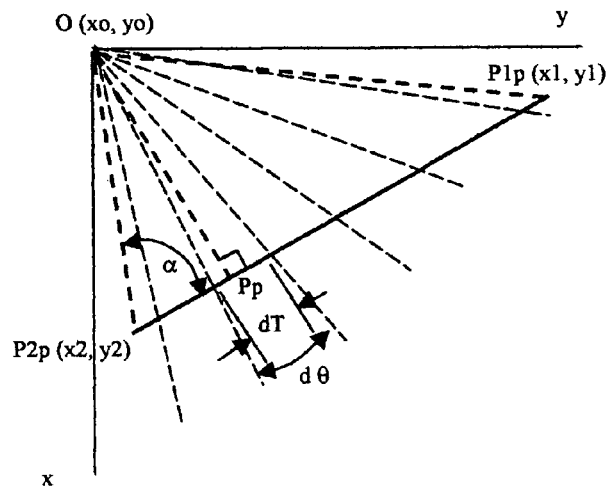

In a rotating screen type display, referring to FIG. 15*a-b*, $dT = r\, d\theta$, where $d\theta$ is the minimum angular space between two adjacent frames, and r depends on the location of the point be rendered. In order to find the optimum number of sampling points, a minimum dT that is just small enough should be used, so that Point Density Control can best work and computation time is minimized.

If rendering a line P1P2, then the minimum dT $$dT = OmPm\, d\theta,$$

OmPm is the shortest distance between the line and the rotating axis 1501. OmPm can be determined from the line's projection on the x-y plane, as follows, $$OmPm = OPp$$
$$\text{Vector } P2pO = [xo - x2, yo - y2]$$
$$\text{Vector } P2pP1p = [x1 - x2, y1 - y2]$$
$$\frac{\text{Vector } P2pO(dot)}{\text{Vector } P2pP1p} = (xo - x2)(x1 - x2) + (yo - y2)(y1 - y2)$$
$$= (P2pO)(P2pP1p)\cos\alpha$$
$$= sqrt\{(xo - x2)^2 + (yo - y2)^2\}$$
$$sqrt\{(x1 - x2)^2 + (y1 - y2)^2\}\cos\alpha$$

So cos α can be determined.

$$OmPm = O\,Pp = P2pO \sin\alpha = sqrt\{(xo-x2)^2+(yo-y2)^2\} sqrt\{1-\cos\alpha)^2\}$$

If rendering a solid triangle, then perform the above calculation on each of the three edges of the triangle to find the minimum dT.

Figure 16A:
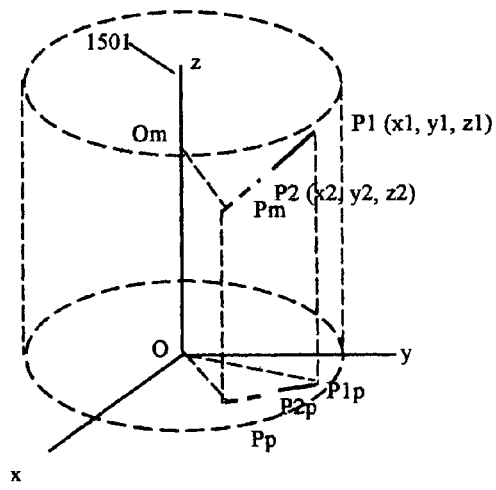
Figure 16B:
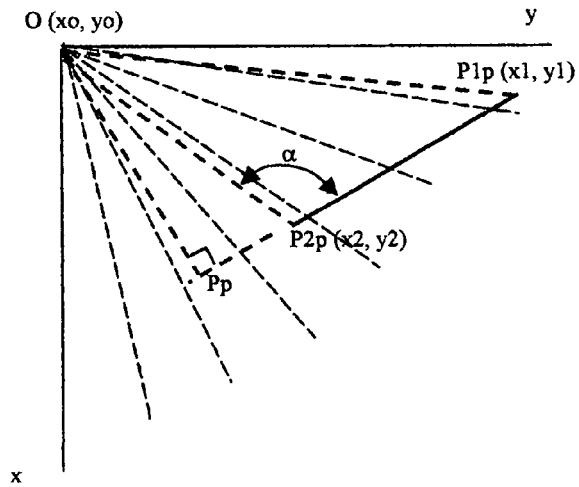

If Pm is outside of the line, as illustrated in FIG. 16*a* and 16*b*, then apply the following equation to each corner points Pi (xi, yi, zi):

$$dTi = rd\theta = sqrt(xi^2+yi^2)d\theta$$

The minimum dTi should be used as dT.

Figure 17A:
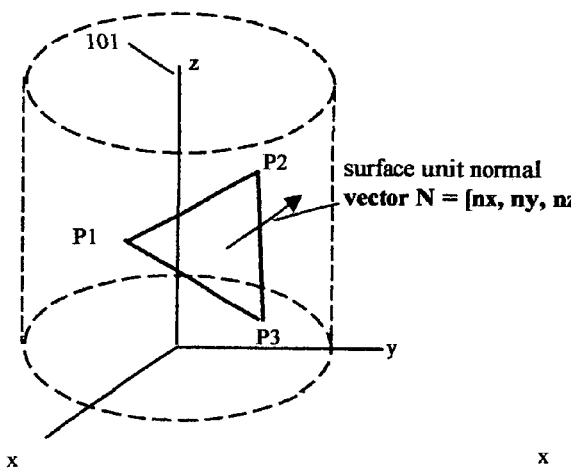
Figure 17B:
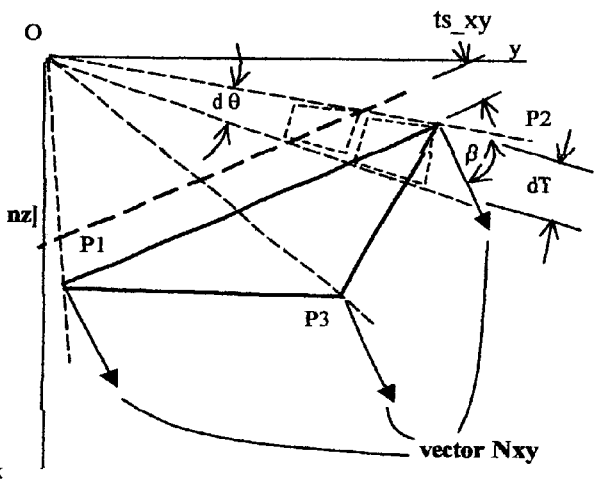
Figure 17C:
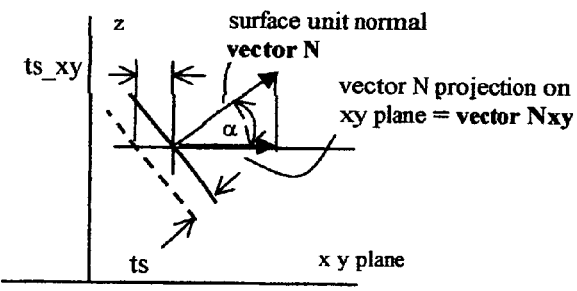

FIG. 17*a-c* shows the method to determine ts of multi-sub-surface in Mulit-layer Rendering. Vector N is the unit normal vector of the ST; Nxy is its projection on xy-plane. At a corner point of the ST, e.g. P2 (x2, y2, z2), the corresponding minimum spacing between two adjacent sub-surfaces projected on xy plane is ts_xy:

$$ts\_xy = dT^* \sin\beta$$
$$dT = rd\theta = sqrt(x2^2+y2^2)d\theta$$

β is the angle between vector Nxy and OP2;

O is on z axis and OP2 is parallel to xy-plane. As a result.

$$ts = ts\_xy^* \cos\alpha$$

sin β and cos α can all be determined from vector N

Apply the above procedure to three corner points and find the largest ts.

8. Variations of this Invention

Point-based rendering described previously adjusts the number of sampling points on the two edges of a ST (or on the three edges of a 3D box) to control the total point density to represent different Brightness Ratio. Alternatively, we can use a fixed mesh size for a ST or a 3D box. When the ST, or the 3D box (or a region of it) has a different brightness ratio instead of re-meshing, the BR can be represented by different total number of points, but all under the same mesh size system. For intersection based rendering, the same can be applied. Fixed pixel mesh size for Composite Bitmap may be more suitable since the bitmaps have an intrinsic mesh size (i.e. the pixel grid).

The region by region method of texture mapping is most easy to conduct using point-based rendering. However, intersection-based scheme can also be applied. In this case, the procedure is:

(1) Map the Composite Bitmap of the 3DT to the UVT.
(2) Render the Composite Bitmap on UVT according to intensity regions of the texture bitmap.
(3) Map the revised Composite Bitmap back to the 3DT.

Similar procedure also applies to Voxel Mapping—the rendering of 3D volume.

The 3D volume and 3D box described in chapter 6 doesn't have to have orthogonal sides, as long as the direction of the mesh system in the 3D box can match the distribution directions of the voxels.

The data structures described in section 5.3 and section 6.5 are described in the form of software code. However, they can also be implemented in firmware or in digital electronic circuits, especially in the case when the algorithms of this invention are implemented on an embedded electronic system.

Figure 12C:
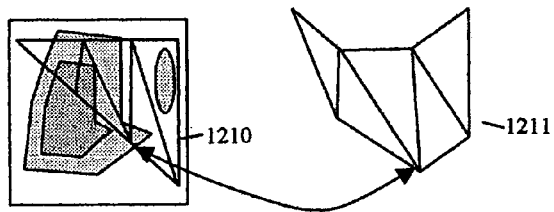
Figure 12C:
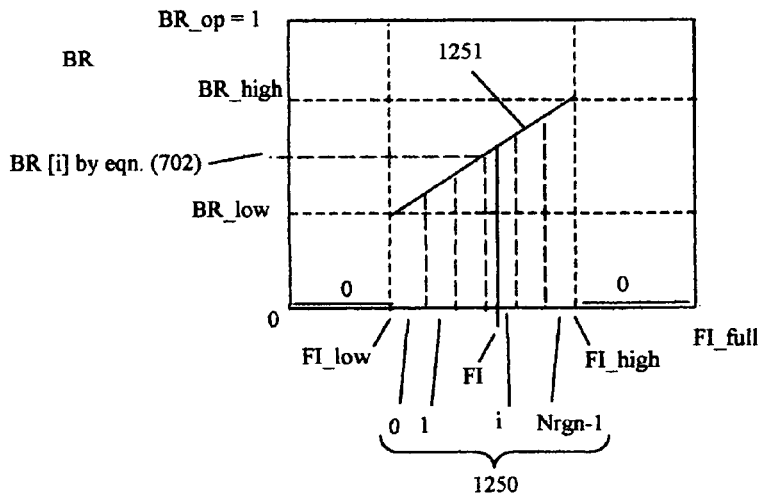
Figure 12D:
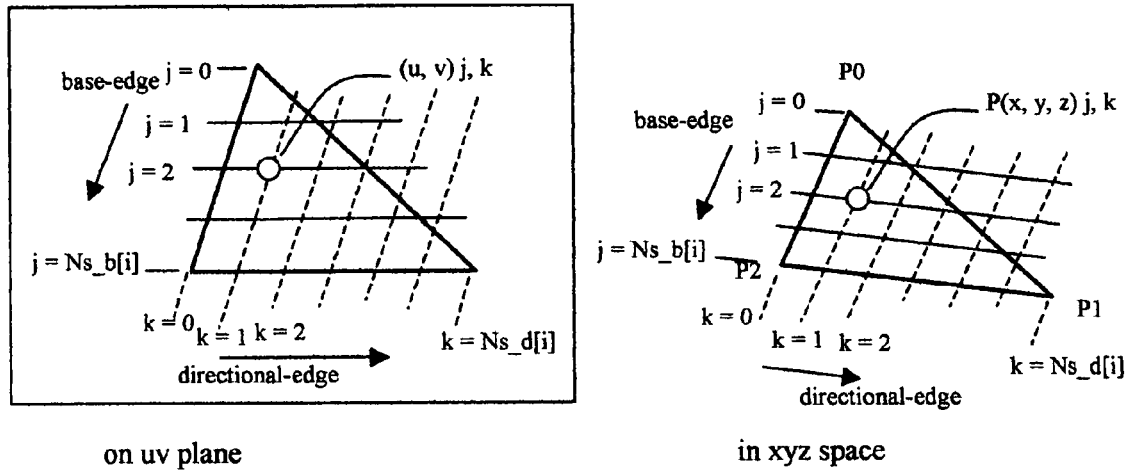
Figure 12E:
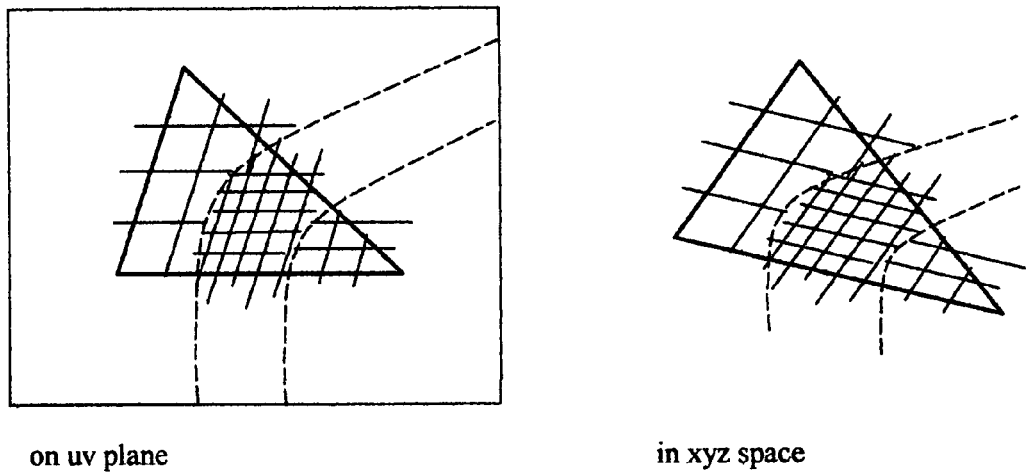

In FIG. 12*c*, and the corresponding eqn. (702), the range of Brightness Ratio, BR, mapped to by the field intensity, FI, is expressed in general form with a top BR_high and a bottom BR_low. The highest brightness ratio, BR_op, is of course 1.

Normally, the mapping can be a linear mapping with FI=0 mapping to BR=0 and FI=FI_full mapping to BR=1. By selecting a low-high window on both FI axis and BR axis for the mapping, we are able to manipulate or to tune the brightness level of the displayed image to enhance or suppress data in a certain range. Further, the mapping does not have to be linear either. The mapping line 1251 can be a curve.

Figure 18:
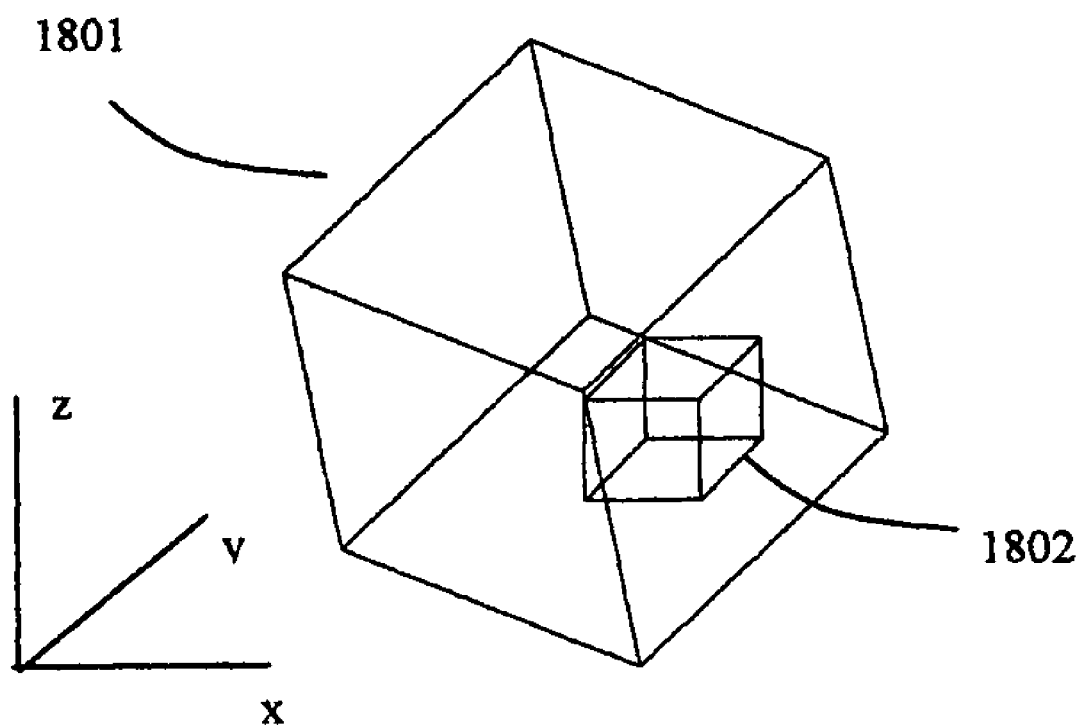
FIG. 18 illustrates the concept of "scan box" by this invention.

One application of the manipulation of BR high-low window is to highlight local information in an image of a 3D volume. One practical issue of displaying data of a 3D volume, such as a medical imaging data of CT or MRI, in a volumetric 3D display is that images in the foreground and the background of a local region of interest could block or disturb the viewing, because images in a V3D display are intrinsically transparent. One solution is to apply a "scan box" to view a local region of interest with normal or enhanced Brightness Ratio while reducing the overall Brightness Ratio outside of the scan box. FIG. 18 illustrates the idea. 1801 is a 3D volume of data displayed as a volumetric 3D image. A smaller box 1802 is defined as the scan box. Parts of the image falling within the scan box are displayed with a normal BR window, e.g. with BR_high=1 and BR_low=0. Parts of the image outside of the scan box are display with a suppressed BR window, e.g. with BR_high=0.3 and BR_low=0. In practice, the 3D volume is first partitioned into two 3D volumes, a big volume corresponding to the original 3D box and a small volume corresponding to the new scan box. The two volumes are then rendered separately by the Voxel Mapping procedure of chapter 6, with different BR windows. When rendering the big volume, the small volume inside it is defined as a new spatial region with BR=0, to make space for the scan box. As a result, the image inside the small volume of the scan box can be viewed with a normal brightness scale while the surrounding image is still visible to provide the context. This can be used to assist searching malign tissues in a 3D medical imaging data.

In general, this invention can be applied to a volumetric 3D display with any form of 3D-distributed display elements. Other examples of projection based systems include a system of helical screen in Thompson et al. U.S. Pat. No. 5,506,597 and a switchable screen system described in Sadovnik et al. U.S. Pat. No. 5,764,317. The display elements do not have to be generated by projection either. If the V3D display is based on two-stage excitation principle, such as the systems of FIG. 21 and FIG. 22 of Tsao, U. S. Pat. No. 6,765,566 B1, then the excited light spots are display elements. If the system is a stack of display panels, such as the system described in Leung et al. U.S. Pat. No. 5,745,197, then the reflective or transmissive pixels are the display elements. The examples mentioned above are therefore incorporated herein by reference.

9. Concluding Notes

The foregoing discussion should be understood as illustrative and should not be considered to be limiting in any sense. While this invention has been particularly shown and described with reference to certain embodiments thereof, it will be understood that these embodiments are shown by way of example only. Those skilled in the art will appreciate that various changes in form and details may be made therein without departing from the spirit and scope of the invention as defined by the following claims and their equivalents.

The invention claimed is:

1. Method of displaying a geometric primitive with a desired brightness level in actual 3D space in a volumetric 3D display, said geometric primitive being a line or a surface, the volumetric 3D display comprising spatially distributed display elements for displaying volumetric 3D images, the method including:
   (1) a step of determining a minimum number, Nge_op, of display elements required to display said geometric primitive at full brightness, Br_op;
   (2) a step of determining a desired number, Nge, of display elements to display said geometric primitive at the desired brightness level based on the following relation:

$(Nge/Nge\_op) \times (Bge/Bge\_f) = Br/Br\_op$, wherein Br representing the desired brightness level of said geometric primitive, Bge_f representing full brightness level of said display element, Bge representing brightness level of said display element to be used to render said geometric primitive;
   (3) a step of rendering said geometric primitive with said desired number of display elements.

2. Method of claim 1, wherein
the step of determining a minimum number of display elements including a step of determining a reference number, Ns_op, of sampling points for representing said geometric primitive at full brightness, each said sampling point mapping to a pre-determined number, N_d, of display elements when said sampling point is at full brightness;

the step of determining a desired number of display elements including a step of determining a desired number, Ns, of sampling points for representing said geometric primitive and a desired dilating number, n_pd, of display elements for each said sampling point based on the following relation:

$[(Ns \times n\_pd)/(Ns\_op \times N\_d)] \times (Bge/Bge\_f) = Br/Br\_op$;

the step of rendering said geometric primitive including:
   (i) a step of distributing said desired number of sampling points in said geometric primitive and computing coordinates of each of the desired sampling points;
   (ii) a step of rendering each of the computed sampling points with said dilating number of display elements.

3. Method of claim 2, wherein
said geometric primitive being a line;
the step of determining a reference number of sampling points for displaying said geometric primitive at full brightness including:
   (a) a step of computing the minimum number of sampling points required to fill the line with said display elements in three orthogonal directions respectively;
   (b) a step of selecting the maximum of the three numbers computed from step (a) as said reference number, Ns_op;

the step of distributing said desired number of sampling points including the step of distributing the sampling points evenly in the line.

4. Method of claim 2, wherein
said geometric primitive being a surface;
said sampling points being distributed among one or more sub-surfaces, said sub-surfaces being closely stacked with a spacing among adjacent sub-surfaces;
the step of determining a reference number, Ns_op, of sampling points for representing said geometric primitive at full brightness including a step of determining an optimum number of sampling points for each sub-surface, the optimum number of sampling points representing a sub-surface at full brightness, the sum of all said optimum numbers for said sub-surfaces being equal to Ns_op;

the step of determining a desired number, Ns, of sampling points for representing said geometric primitive including a step of selecting a number of sampling points for each sub-surface, the total number of sampling points on all said sub-surfaces being equal to Ns;

the step of distributing said desired number of sampling points including a step of distributing the selected number of sampling points for each sub-surface in each corresponding sub-surface.

5. Method of claim 4, further including a step of determining a minimum value of said spacing based on orientation and position of said surface with respect to spatial distribution of the display elements so that display elements mapped by adjacent sampling points do not overlap.

6. Method of claim 4, wherein
said surface being a triangular surface, said sub-surfaces being triangular as well;
the step of determining the optimum number of sampling points for a sub-surface including:
  (a) a step of determining an optimum number of sampling points for each of the three edges of the sub-surface, the optimum number of sampling points for an edge being the minimum number of sampling points required to fill the edge with said display elements at full brightness;
  (b) a step of defining the edge having the highest optimum number, Ns_op_d, of sampling points as directional edge, defining the edge having the lowest optimum number, Ns_op_b, of sampling points as base edge;
  (c) a step of determining the optimum number of sampling points for a sub-surface based on the value Ns_op_d×Ns_op_b/2;

the step of selecting a number of sampling points for a sub-surface including a step of determining a number, Ns_d, of sampling points on the directional edge and a second number, Ns_b, of sampling points on the base edge, and determining the selected number of sampling points for a sub-surface based on the value Ns_d×Ns_b/2;

the step of distributing sampling points in a sub-surface including:
  (a) a step of computing coordinates of said Ns_d sampling points on the directional edge and of said Ns_b sampling points on the base edge;
  (b) a step of constructing a mesh system over the sub-surface by conceptually drawing mesh lines from each of said Ns_b sampling points on the base-edge in a direction parallel to the directional-edge, and drawing mesh lines from each of said Ns_d sampling points on the directional-edge in a direction parallel to the base-edge;
  (c) a step of placing a sampling point to each intersection of the mesh lines that falls within the sub-surface.

7. Method of claim 6, wherein the step of determining the number Ns_d and the number Ns_b including
  (a) a step of the step of computing the two numbers based on the orientation of the triangular surface with respect to the structure of display elements and
  (b) a step of adjusting the numbers to give meshes of approximately equal spacing in the two rendering directions.

8. Method of claim 1, wherein
the step of determining a minimum number of display elements including:
  (i) a step of computing the intersections of said geometric primitive with frame slices of the structure of the display elements, each said intersection comprising a small bitmap, each pixel of said small bitmap comprising one of said display elements;
  (ii) a step of stitching said intersections together into a composite bitmap;
  (iii) a step of fully rendering said composite bitmap at full brightness, said composite bitmap having a total number of Np_CBM_f pixels;
the step of determining a desired number of display elements including a step of determining a desired number, Np_CBM, of pixels for rendering said composite bitmap based on the following relation: (Np_CBM/Np_CBM_f)×(Bge/Bge_f)=Br/Br_op;
the step of rendering said geometric primitive including:
  (i) a step of re-rendering said composite bitmap with the desired number of pixels;
  a step of (ii) rendering said intersections according to the re-rendered composite bitmap.

9. Method of claim 1, wherein said brightness level being a brightness level of one of primary colors, the method further including a step of displaying the geometric primitive with brightness level of other primary colors in order to display said geometric primitive in desired color level.

10. Method of displaying a surface in actual 3D space in a volumetric 3D display, a surface carrying a monochromatic texture map, the volumetric 3D display comprising spatially distributed display elements for displaying volumetric 3D images, the method including:
  (1) a step of dividing the intensity scale of the texture map into a number of different intensity ranges, therefore each said intensity range mapping to a different region on the texture map;
  (2) a step of mapping each said region of the texture map to a corresponding region on said surface; by linear proportion;
  (3) a step of assigning a value brightness ratio to each said corresponding region based on the intensity range that corresponds to that region, said brightness ratio being defined as the ratio of desired brightness of said corresponding region to be rendered to full brightness of said corresponding region if fully rendered;
  (4) a step of rendering each said corresponding region of the surface with a different distribution density of said display elements to represent different brightness ratio, thereby displaying in actual 3D space in said volumetric 3D display said surface carrying said monochromatic texture map.

11. Method of claim 10, wherein the step of rendering each said corresponding region of the surface including a step of representing the region with sampling points by distributing the sampling points at a desired point density and by mapping each said sampling point to a desired number, called dilating number, of said display elements, combination of the desired point density and the desired dilating number forming the brightness ratio of the region.

12. Method of claim 11, wherein
said surface being a triangular surface;
the step of representing each said corresponding region of the surface with sampling points including:
  (i) a step of constructing a mesh system comprising intersecting mesh lines for placing sampling points at intersections of the mesh lines, said mesh system having a mesh density required to render said triangular surface at a brightness ratio equal to the brightness ratio of said corresponding region;
(ii) a step of placing sampling points according to the mesh system but only at the intersections located within said corresponding region.

13. Method of claim 12, further including:
a step of assigning a region index to each pixel of the texture map, each said region index pointing to one of said corresponding regions on said surface, the pointed corresponding region being the region that the intensity range of the pixel corresponds to;
a step of setting up a data structure of said region index of each pixel of the texture map with respect to the location of the pixel in the texture map;
a step of mapping said mesh system to the texture map by proportion and thereby each intersection of mesh lines mapping to one pixel on the texture map; and
a step of checking if an intersection of mesh lines falls within the corresponding region by using the data structure to check if the region index of the pixel mapped to by the intersection matches the corresponding region that is under rendering.

14. Method of claim 10, wherein said monochromatic texture map being one filed of a color texture map, the method further including a step of displaying the surface carrying texture maps of other primary colors in order to display the surface with the color texture map.

15. Method of displaying a 3D volume with a distribution of monochromatic intensity scale in actual 3D space in a volumetric 3D display, the volumetric 3D display comprising spatially distributed display elements for displaying volumetric 3D images, the method including:
(1) a step of dividing the intensity scale of the 3D volume into a number of different intensity ranges, each said intensity range thereby mapping to a different spatial region in the 3D volume;
(2) a step of assigning a brightness ratio, BR, to each said spatial region in the 3D volume based on the corresponding intensity range mapped to the spatial region, said brightness ratio being defined as the ratio of desired brightness to full brightness;
(3) a step of rendering each said spatial region with a different density of said display elements to represent different brightness ratio; the step including a step of representing the spatial region with sampling points by distributing the sampling points at a desired point density using a desired mesh system and by mapping each said sampling point to a desired number, called dilating number $n\_pd$, of said display elements, a mesh system comprising intersecting mesh lines for placing sampling points at intersections of the mesh lines, combination of the desired point density and the desired dilating number forming the brightness ratio of the spatial region;
the step of representing each said spatial region with sampling points including:
(i) a step of constructing a reference mesh system and setting a reference dilating number, $N\_d$, said reference mesh system having a mesh density required to render the whole 3D volume at full intensity when said reference dilating number is used;
(ii) a step of determining said desired mesh system and said desired dilating number based on the following relation:

$$[(Ns \times n\_pd)/(Ns\_op \times N\_d)] \times (Bge/Bge\_f) = BR;$$

wherein Ns representing the number of sampling points for rendering the whole 3D volume using the desired mesh system, $Ns\_op$ representing the number of sampling points for rendering the whole 3D volume using the reference mesh system, $Bge\_f$ representing full brightness level of said display element, Bge representing brightness level of said display element to be used to render said geometric primitive;
(iii) a step of placing sampling points according to the desired mesh system and only at the intersections located within said spatial region.

16. Method of claim 15, wherein said 3D volume comprising 3D data voxels, the method further including:
a step of assigning each of the voxels with a region index pointing to the corresponding spatial region mapped by the intensity range of the voxel and setting up a data structure of said region index of each voxel with respect to the location of the voxel in the 3D volume;
a step of mapping said desired mesh system to the 3D volume and thereby each intersection of mesh lines mapping to one voxel in the 3D volume;
a step of checking if an intersection of mesh lines falls within the corresponding spatial region by using said data structure to check if the region index of the voxel mapped to by the intersection matches the corresponding spatial region under rendering.

17. Method of claim 15, wherein said 3D volume comprising 3D data voxels, the method further including:
a step of assigning each of the voxels with a region index pointing to the corresponding spatial region mapped by the intensity range of the voxel and setting up a data structure of said region index of each voxel with respect to the location of the voxel in the 3D volume;
a step of mapping the voxels of a same region index to a desired mesh system corresponding to each said spatial region and thereby each voxel in the 3D volume mapping to one or more intersections of mesh lines.

18. Method of claim 15, wherein said monochromatic intensity scale being an intensity scale of one of primary colors, the method further including a step of displaying the 3D volume with brightness scale of other primary colors in order to display said 3D volume in desired color level.

19. Method of claim 15, farther including:
a step of defining a scan box within the space of the 3D volume;
a step of defining a small 3D volume corresponding to the space covered by the scan box;
a step of rendering and displaying said small 3D box; and
a step of displaying the original 3D volume at a reduced brightness ratio.

* * * * *